(12) United States Patent
Singh

(10) Patent No.: US 10,448,098 B2
(45) Date of Patent: Oct. 15, 2019

(54) METHODS AND SYSTEMS FOR CONTEXTUAL ADJUSTMENT OF THRESHOLDS OF USER INTERESTEDNESS FOR TRIGGERING VIDEO RECORDING

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 15/976,696

(22) Filed: May 10, 2018

(65) Prior Publication Data
US 2018/0262804 A1   Sep. 13, 2018

Related U.S. Application Data

(63) Continuation of application No. 15/310,688, filed as application No. PCT/US2015/026385 on Apr. 17, 2015, now Pat. No. 10,070,178.
(Continued)

(51) Int. Cl.
*H04N 21/442* (2011.01)
*H04N 21/422* (2011.01)
(Continued)

(52) U.S. Cl.
CPC . *H04N 21/44218* (2013.01); *H04N 21/42201* (2013.01); *H04N 21/42202* (2013.01);
(Continued)

(58) Field of Classification Search
CPC ....... H04N 21/44218; H04N 21/42201; H04N 21/42202; H04N 21/4334; H04N 21/4524; H04N 21/47217; H04N 21/8456
See application file for complete search history.

(56) References Cited

U.S. PATENT DOCUMENTS

| 7,483,618 B1 | 1/2009 | Edwards |
| 7,894,639 B2 | 2/2011 | Grim, III |

(Continued)

FOREIGN PATENT DOCUMENTS

| CN | 101247512 A | 8/2008 |
| CN | 101517650 A | 8/2009 |

(Continued)

OTHER PUBLICATIONS

R.W. Picard and J. Healey; "Affective Wearables", MIT Media Laboratory, Cambridge, MA, USA, pp. 231-240.
(Continued)

*Primary Examiner* — Mishawn N. Hunter
(74) *Attorney, Agent, or Firm* — Invention Mine LLC

(57) ABSTRACT

Disclosed herein are methods and systems for contextual adjustment of thresholds of user interestedness for triggering video recording. An embodiment takes the form of a method that includes identifying one or more current contextual attributes of a current context of a user. The method also includes setting a current value of a stored interestedness threshold based at least in part on the one or more identified current contextual attributes. The method also includes obtaining one or more current physiological measurements of the user. The method also includes deriving an interestedness score based at least in part on the one or more obtained current physiological measurements. The method also includes comparing the derived interestedness score to the current value of the stored interestedness threshold. The method also includes initiating video recording when the derived interestedness score exceeds the current value of the stored interestedness threshold.

23 Claims, 12 Drawing Sheets

Related U.S. Application Data

(60) Provisional application No. 62/001,478, filed on May 21, 2014.

(51) Int. Cl.
*H04N 21/433* (2011.01)
*H04N 21/45* (2011.01)
*H04N 21/472* (2011.01)
*H04N 21/845* (2011.01)

(52) U.S. Cl.
CPC ..... *H04N 21/4334* (2013.01); *H04N 21/4524* (2013.01); *H04N 21/47217* (2013.01); *H04N 21/8456* (2013.01)

(56) References Cited

U.S. PATENT DOCUMENTS

| | | | |
|---|---|---|---|
| 8,196,168 | B1 | 6/2012 | Bryan |
| 8,676,828 | B1 | 3/2014 | Agarwal |
| 2005/0028194 | A1 | 2/2005 | Elenbaas |
| 2007/0239847 | A1 | 10/2007 | Takehara |
| 2007/0282783 | A1 | 12/2007 | Singh |
| 2008/0214903 | A1 | 9/2008 | Orbach |
| 2012/0324491 | A1 | 12/2012 | Bathiche |
| 2012/0328263 | A1 | 12/2012 | Barton |
| 2014/0223462 | A1 | 8/2014 | Aimone |
| 2015/0110462 | A1 | 4/2015 | Maisenbacher |
| 2015/0262232 | A1 | 9/2015 | Klein |
| 2015/0281764 | A1 | 10/2015 | Stathacopoulos |

FOREIGN PATENT DOCUMENTS

| | | |
|---|---|---|
| CN | 103281500 A | 9/2013 |
| CN | 103609128 A | 2/2014 |
| EP | 2617354 | 7/2013 |
| EP | 2723089 | 4/2014 |
| WO | 2008038230 A2 | 4/2008 |
| WO | 2012174381 A2 | 12/2012 |
| WO | 2014024209 | 2/2014 |

OTHER PUBLICATIONS

M. HÂkansson, et al, "Capturing the Invisible: Designing Context-Aware Photography", Copyright 2003 ACM 1-58113-728-728-1 03/0006. 4 pages.
"Context-Aware Technologies, systems and applications" power point presentation, 32 slides.
R. Nielek and A. Wierzbicki, "Emotion Aware Mobile Application", Polish Japanese Institute of Technology, ul. Koszykowa 86, 02-008, Warszawa, Poland. pp. 122-131.
A. Lockerd and F. Mueller, "LAFCam-Leveraging Affective Feedback Camcorder", MIT Media Lab. Interactive Poster: Emerging Interactive Devices, CHI 2002: changing the world, changing ourselves.
J. Gemmell, et. al., "Passive Capture and Ensuing Issues for a Personal Lifetime Store", Microsoft Research.
S. Hodges, et. al., "SesneCam: A Retrospective Memory Aid", Microsoft Research.
Jennifer A. Healey, "Sensing Affective Experience", J.H.D.M Westerink et. al. (eds.), Probing Experience, 2008 Springer, 91-100.
J. Healey and R.W. Picard, "StartleCam: A Cybernetic Wearable Camera", MIT Media Laboratory.
R.W. Picard, "Toward computers that recognize and respond to user emotion", IBM Systems Journal, vol. 39, Nos. 3&4, copyright 2000. pp. 705-719.
International Search Report and Written Opinion of the International Searching Authority for PCT/US2015/026385, dated Jul. 8, 2015, 11 pages.
Written Opinion of the International Preliminary Examining Authority for PCT/US2015/026385 dated Apr. 7, 2016.
Notification of transmittal of the International Preliminary Report on Patentability for PCT/US2015/026385 dated Jul. 29, 2016.
Neurowear "Neurocam" Concept Movie (from YouTube) https://www.youtube.com/watch?v=CDgkX-JY_wM, published on Oct. 29, 2013, (last visited May 7, 2018).

METHODS AND SYSTEMS FOR CONTEXTUAL ADJUSTMENT OF THRESHOLDS OF USER INTERESTEDNESS FOR TRIGGERING VIDEO RECORDING

CROSS-REFERENCE TO RELATED APPLICATIONS

This application is a continuation application of U.S. patent application Ser. No. 15/310,688, entitled METHODS AND SYSTEMS FOR CONTEXTUAL ADJUSTMENT OF THRESHOLDS OF USER INTERESTEDNESS FOR TRIGGERING VIDEO RECORDING, filed on Nov. 11, 2016, which is a 35 U.S.C. 371 of International Application PCT PCT/US2015/026385, entitled METHODS AND SYSTEMS FOR CONTEXTUAL ADJUSTMENT OF THRESHOLDS OF USER INTERESTEDNESS FOR TRIGGERING VIDEO RECORDING, filed on Apr. 17, 2015, which claims priority to U.S. Provisional Application No. 62/001,478, filed May 21, 2014, entitled "METHODS AND SYSTEMS FOR CONTEXTUAL ADJUSTMENT OF THRESHOLDS OF USER INTERESTEDNESS FOR TRIGGERING VIDEO RECORDING", all of which applications are hereby incorporated by reference in their entirety.

BACKGROUND

Millions of people make daily use of portable computing and communication devices, many of which can accurately be characterized as wireless-communication devices (WCDs) in that they are equipped, programmed, and configured such that they are able to engage in wireless communication with one or more other devices, directly and/or via one or more radio access networks (RANs). These WCDs typically engage in these communications according to one or more protocols such as Long Term Evolution (LTE), Global System for Mobile Communications (GSM), WiMAX, Wi-Fi, Bluetooth®, and/or the like.

In order to facilitate these communications, a given RAN typically includes one or more entities often known by terms such as base station, eNodeB, wireless access point, and the like. As is known in the art, these entities are in turn connected to one or more core-network entities, which themselves are connected to one or more transport and/or signaling networks such as the Internet, the public switched telephone network (PSTN), and the like.

Moreover, another burgeoning area of technology is that of wearable computing and communication devices (also known by terms such as wearable computers, wearables, and the like), some examples of which take forms that are similar to eyeglasses, wristwatches, wristbands, and the like. Various different wearables are worn for a variety of different reasons, some examples of which are increased and/or more convenient functionality (e.g., hands-free capturing of pictures and video), monitoring health, improving fitness, and the like. Consistent with such uses, many wearables are equipped with one or more sensors that are configured to carry out functions such as monitoring heart rate (i.e., pulse), monitoring blood pressure, monitoring body temperature, gaze tracking, and the like.

Many wearables are capable of engaging in one or more forms of short-range and/or long-range wireless communication, and thus it can accurately be said that some wearables are or include WCDs. For example, many wearables engage in short-range wireless communications with what may fairly be described as a user's primary WCD (e.g., smartphone, tablet, or the like) according to near-field communication (NFC) protocols such as Bluetooth® and the like. As another example, many wearables engage in relatively more long-range wireless communication with one or more cellular networks (i.e., wireless wide area networks (WWANs)) according to protocols such as LTE, GSM, and the like. Moreover, some wearable computers are equipped, programmed, and configured to be able to engage in both short-range wireless communication and long-range wireless communication. And many WCDs, be they wearables or not, are equipped to communicate with one or more peripheral wearable devices that may have one or more sensors such as those described. At times, terms such as Body Area Networks (BANs) are used to describe groups of communicatively connected devices located on or about (e.g., on the clothing of) particular users.

Another up-and-coming area of technology is often referred to as "affective technology," which is designed to infer one or more emotions (i.e., emotional states, moods, and/or the like) of its user and/or one or more other people. In some instances, affective-technology devices make such inferences based at least in part on one or more physiological parameters such as heart rate, pupil dilation, and the like (i.e., biometric data). In some examples, affective-technology devices compare absolute values of such parameters with thresholds. In some examples, these devices compare changes (i.e., deltas) in the values—perhaps over a limited period of time (i.e., sufficiently sudden changes)—of such parameters with thresholds. In some instances, affective-technology devices infer one or more emotions of one or more people at least in part by detecting one or more facial expressions. And certainly other approaches are used as well.

BRIEF DESCRIPTION OF THE DRAWINGS

A more detailed understanding may be had from the following description, presented by way of example in conjunction with the accompanying drawings, brief descriptions of which are listed below.

DETAILED DESCRIPTION

Figure 1A:
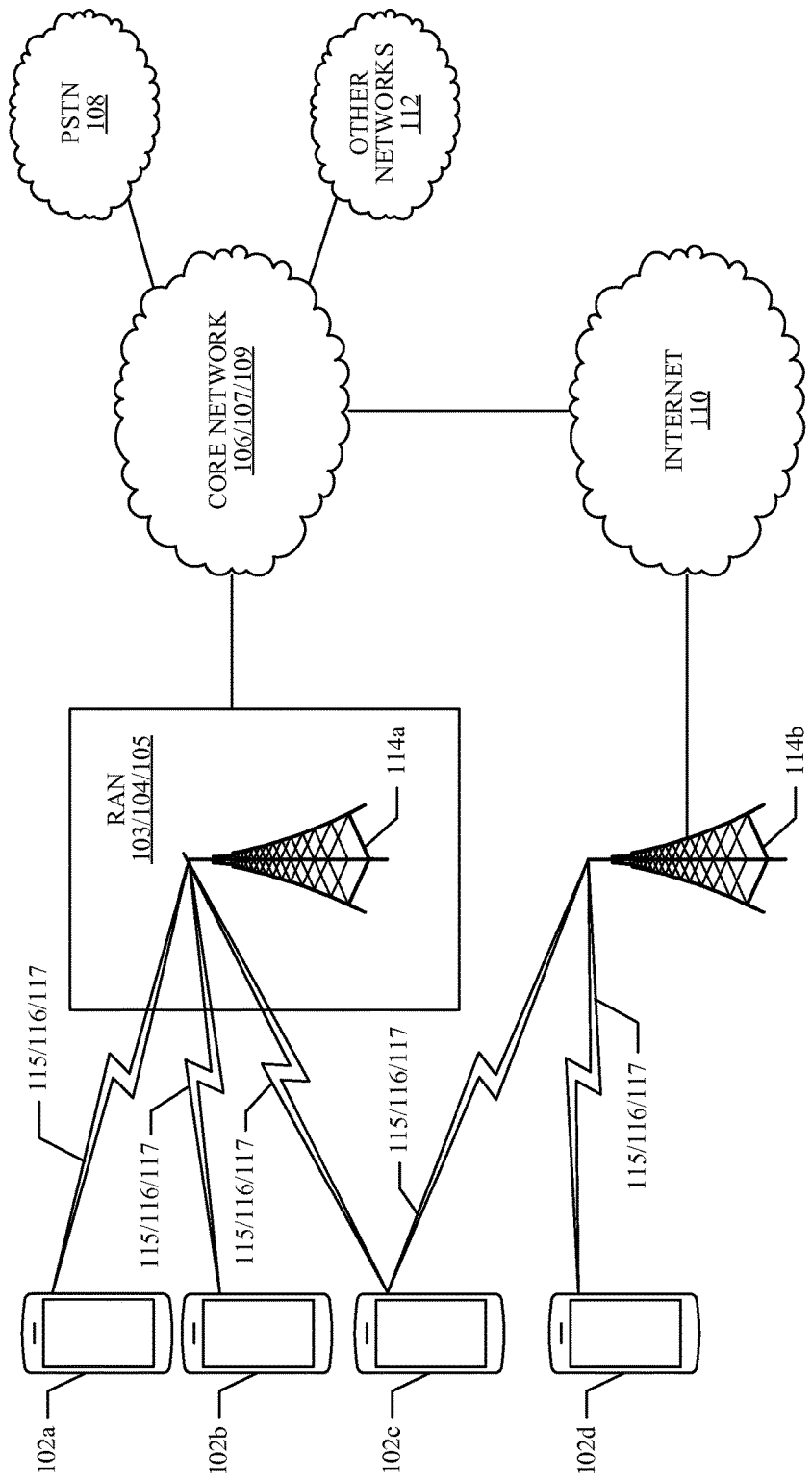
FIG. 1A depicts an example communications system in which at least one embodiment may be implemented.

Many personal computing devices, be they handheld devices such as smartphones and tablets, wearable devices that resemble eyeglasses, or another type of device, have the capability of recording video. Indeed, some such devices are configured, at least in their default state, to continuously record video, resulting in a user having a great deal of video data through which to search in order to find one or more segments of video pertaining to something in which the user is interested (or was interested, or remembers being interested, etc.). Some devices are configured to record video in response to user commands, often resulting in users forgetting or otherwise failing to initiate video recording when something is happening that is of interest to the user. As such, many users experience one or both of the following frustrations: having too much captured video through which to sift and not having enough captured video of events that are interesting to that user.

To address those issues as well as others, disclosed herein are methods and systems for contextual adjustment of thresholds of user interestedness for triggering video recording. The presently disclosed methods and systems spring at least in part from a realization made by the inventor of the importance of context when automating the capture of video based on data—e.g., physiological data—that is being used as a basis for inferring that a given user is in a heightened state of interestedness with respect to the scene at which the user is looking. Indeed, one of the insights made by the inventor is that the same biometric data (i.e., a set of one or more respective values of one or more physiological parameters) very often means different things in different contexts with respect to inferring that a user is interested in something and responsively initiating video recording.

Moreover, it is noted that initiating video recording takes different forms in different embodiments, a few examples including transitioning a video-recording function from an "off" state to an "on" state, bookmarking one or more points in a video stream that is being continuously captured (i.e., where a video-recording function is always (or substantially always) in an "on" state). And certainly other examples could be listed as well.

With respect to the above-made point that the same biometric data very often means different things in different contexts with respect to inferring that a user is interested in something, this is another way of stating the insight made by the inventor that physiological readings can go up and down due to factors that do not relate to the level of interestedness that the user has in a particular scene at a particular moment. As one example, a user that is working from home and has two-year old twins in the background may have elevated readings for blood pressure and skin conductivity while answering a routine e-mail. That biometric data does not necessarily imply that the user's level of interestedness in that particular e-mail is high. As other examples, a user may have one or more elevated biometric readings because they are in a loud place, because they are in a crowded place, because they are late for an important calendar event, and/or for one or more other reasons that do not necessarily imply that the user has a heightened level of interestedness in the particular scene at which they are looking at that moment. And certainly other examples could be listed.

As such, in accordance with at least one embodiment, a level of interestedness of a user in a scene at which that user is looking is determined using the user's biometric data, and that level of interest is then evaluated—for purposes of starting (or stopping) the recording of video—against a threshold that is selected based at least in part on the user's current situational context. As such, and by way of example, an inferred biometric-interestedness score (i.e., the level of interestedness inferred from biometric data) required to initiate video recording when a user is driving their car to work could be different from the inferred biometric-interestedness score required to initiate video recording when that same user is driving that same car home from work. As another example, the interestedness score required to initiate video recording while a user is sitting on a quiet park bench could be different from the interestedness score required to initiate video recording while the user is grocery shopping at a busy market on a Saturday afternoon. And other examples could be listed.

One embodiment takes the form of a method that includes identifying one or more current contextual attributes of a current context of a user; setting a current value of a stored interestedness threshold based at least in part on the one or more identified current contextual attributes; obtaining one or more current physiological measurements of the user; deriving an interestedness score based at least in part on the one or more obtained current physiological measurements; comparing the derived interestedness score to the current value of the stored interestedness threshold; and initiating video recording when the derived score exceeds the current value of the stored threshold.

One embodiment takes the form of a system that includes a situational module, a biometrics module, a video-recording module, and an evaluation module. The situational module is configured to identify one or more current contextual attributes of a current context of a user. The biometrics module is configured to obtain one or more current physiological measurements of the user. The video-recording module is configured to initiate video recording upon receipt of a video-recording-initiate command. The evaluation module is configured to: set a current value of a stored interestedness threshold based at least in part on the one or more identified current contextual attributes; derive an interestedness score based at least in part on the one or more obtained current physiological measurements; compare the derived interestedness score to the current value of the stored interestedness threshold, and transmit a video-recording-initiate command to the video-recording module when the derived score exceeds the current value of the stored threshold.

In various different embodiments, the one or more current contextual attributes include one or more of a current location, a crowdedness level, and a noisiness level.

In at least one embodiment, the one or more current contextual attributes include a stored calendar event. In at least one such embodiment, the stored calendar event has an associated scheduled start time that is less than a first threshold amount of time after the current time. In at least one such embodiment, the stored calendar event has an associated scheduled start time that precedes the current time. In at least one such embodiment, the stored calendar event has a priority level that exceeds a stored priority-level threshold.

In at least one embodiment, the current value of the stored interestedness threshold exceeds an immediately preceding value of the stored interestedness threshold. In at least one embodiment, the current value of the stored interestedness threshold is less than an immediately preceding value of the stored interestedness threshold.

In at least one embodiment, the one or more current physiological measurements includes one or both of a current facial expression and a recently assumed posture. In at least one embodiment, the one or more current physiological measurements indicate one or more of a current respiration rate, a current heart rate, a current blood-pressure level, a current level of skin conductivity, a current body temperature, and a current electroencephalography (EEG), measurement.

In at least one embodiment, deriving the interestedness score based at least in part on the one or more obtained current physiological measurements includes using historical physiological measurements to normalize the one or more obtained current physiological measurements. In at least one embodiment, deriving the interestedness score based at least in part on the one or more obtained current physiological measurements includes referencing correlation data that maps sets of one or more values of physiological measurements to respective interestedness scores.

In at least one embodiment, the following functions are carried out: deriving a second interestedness score, comparing the second interestedness score to a second threshold, and terminating video recording when the second interestedness score does not exceed the second threshold. In at least one such embodiment, the second threshold is equal to the stored interestedness threshold. In at least one such embodiment, the second threshold is not equal to the stored interestedness threshold.

In at least one embodiment, the following function is carried out: terminating video recording responsive to receiving a video-terminate command via a user interface. In at least one embodiment, the following function is carried out: terminating video recording after a timeout period.

Any of the variations and permutations described in the preceding paragraphs and/or anywhere else in this disclosure in connection with various different (method and/or system) embodiments can be implemented with respect to any embodiments, including with respect to any method embodiments and with respect to any system embodiments.

It is also noted that, in this disclosure, various elements of one or more of the described embodiments are referred to as "modules" that carry out (i.e., perform, execute, and the like) various functions that are described herein in connection with the respective modules. As used herein, a module includes any necessary hardware (e.g., one or more processors, one or more microprocessors, one or more microcontrollers, one or more microchips, one or more application-specific integrated circuits (ASICs), one or more field programmable gate arrays (FPGAs), one or more memory devices, and/or one or more of any other type or types of devices and/or components) deemed suitable by those of skill in the relevant art for a given implementation. Each described module also includes (or at least has access to) any necessary instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media.

Further description of illustrative embodiments is provided below with reference to the various figures. And although this description provides detailed examples pertaining to various possible implementations, it should be noted that these provided details are intended to be by way of example and in no way to limit the scope of the application.

The next portion of the disclosure includes description of FIGS. 1A-1F, which in general depict various architectures and arrangements for communications systems in which one or more embodiments could be carried out. It is explicitly noted, however, that such communications systems (e.g., one or more WWANs) are not necessary in connection with all embodiments. Indeed, some embodiments are carried out by a system (e.g., a wearable computing system) that does not have any WWAN-communication capability, and indeed some embodiments are carried out by systems having no wireless-communication capability. Some such systems may have a wired-communication interface such as a USB port or the like, though this is optional as well. In general, at least one embodiment is carried out by a computing system (e.g., a wearable system) having no capability of communicating with any other computing or communication device.

FIG. 1A is a diagram of an example communications system 100 in which at least one embodiment may be implemented. In at least one embodiment, the communications system 100 is a multiple access system that provides content, such as voice, data, video, messaging, broadcast, and the like, to multiple wireless users. In at least one embodiment, the communications system 100 enables multiple wireless users to access such content through the sharing of system resources, including wireless bandwidth. The communications systems 100 may employ one or more multiple-access methods, such as code division multiple access (CDMA), time division multiple access (TDMA), frequency division multiple access (FDMA), orthogonal FDMA (OFDMA), single-carrier FDMA (SC-FDMA), and the like.

As depicted in FIG. 1A, the communications system 100 includes WTRUs 102*a-d* (which generally or collectively may be referred to as WTRU 102, and each of which is a type of WCD as that term is used herein), a RAN 103/104/ 105, a core network 106/107/109, the PSTN 108, the Internet 110, and other networks 112, though it will be appreciated that the disclosed embodiments contemplate any number of WTRUs, base stations, networks, and/or network elements. Each of the WTRUs 102*a-d* may be any type of device configured to operate and/or communicate in a wireless environment. By way of example, the WTRUs 102*a-d* may be configured to transmit and/or receive wireless signals and may each be or include one or more of a user equipment (UE), a mobile station, a subscriber unit, a pager, a cellular telephone, a personal digital assistant (PDA), a smartphone, a laptop, a netbook, a personal computer, a wearable computing device (e.g., glasses, wristband, necklace etc.), a wireless sensor, consumer electronics, and the like.

In the depicted embodiment, the communications system 100 also includes a base station 114*a* and a base station 114*b*, each of which may be any type of device configured to wirelessly interface with at least one of the WTRUs 102*a-d* to facilitate access to one or more communication networks, such as the core network 106/107/109, the Internet 110, and/or the networks 112. Each of the base stations 114*a-b* may be or include one or more of a base transceiver station (BTS), a NodeB, an eNodeB, a Home NodeB, a Home eNodeB, a site controller, an access point, a wireless router, and the like. While the base stations 114*a-b* are each depicted as a single element, each may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

In the depicted embodiment, the base stations 114a-b communicate with the WTRUs 102a-d over an air interface 115/116/117, which may be any suitable wireless link (e.g., radio frequency (RF), microwave, infrared (IR), ultraviolet (UV), visible light, and the like). The air interface 115/116/117 may be established using any radio access technology (RAT) deemed suitable by those of skill in the art for a given implementation.

As noted above, in at least one embodiment, the communications system 100 is a multiple-access system, and accordingly employs one or more multiple-access schemes such as CDMA, TDMA, FDMA, OFDMA, SC-FDMA, and the like. For example, the base station 114a and the WTRUs 102a-c may implement a radio technology such as Universal Mobile Telecommunications System (UMTS) Terrestrial Radio Access (UTRA), which may establish the air interface 115/116/117 using wideband CDMA (WCDMA), perhaps involving the use of protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a-c implement a radio technology known as Evolved UTRA (E-UTRA), which may establish the air interface 115/116/117 using LTE and/or LTE-Advanced (LTE-A).

In other embodiments, the base station 114a and the WTRUs 102a-c implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), and the like.

The base station 114b could be a wireless router, Home Node B, Home eNodeB, or access point, as examples, and may utilize any suitable RAT for facilitating wireless connectivity in a localized area, such as a place of business, a home, a vehicle, a campus, and the like. In one embodiment, the base station 114b and the WTRUs 102c-d implement a radio technology known as IEEE 802.11 to establish a wireless local area network (WLAN). In another embodiment, the base station 114b and the WTRUs 102c-d implement a radio technology known as IEEE 802.15 to establish a wireless personal area network (WPAN). In yet another embodiment, the base station 114b and the WTRUs 102c-d utilize a cellular-based RAT (e.g., WCDMA, CDMA2000, GSM, LTE, LTE-A, and the like) to establish a picocell, femtocell, or the like. As shown in FIG. 1A, the base station 114b may have a direct connection to the Internet 110. Thus, the base station 114b may not only be able to access the Internet 110 via the core network 106/107/109.

In the embodiment that is depicted in FIG. 1A, the RAN 103/104/105 is in communication with the core network 106/107/109, which may be any type of network configured to provide voice, data, applications, voice over internet protocol (VoIP) services, and/or the like to one or more of the WTRUs 102a-d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology. And certainly many other examples could be listed.

In the depicted embodiment, the core network 106/107/109 also serves as a gateway for the WTRUs 102a-d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as transmission control protocol (TCP), user datagram protocol (UDP), and Internet Protocol (IP) in the TCP/IP Internet protocol suite. The networks 112 may include wired and/or wireless communications networks owned and/or operated by other service providers. As one example, the other networks 112 may include another core network connected to one or more RANs, which may employ the same RAT or a different RAT as the RAT that is employed by the RAN 103/104/105.

Some or all of the WTRUs 102a-d in the communications system 100 may include multi-mode capabilities; e.g., the WTRUs 102a-d may include multiple transceivers for communicating with different wireless networks over different wireless links. For example, the WTRU 102c may be configured to communicate with the base station 114a, which may use a cellular technology, and with the base station 114b, which may use an IEEE 802 technology. And certainly many other examples could be listed.

Figure 1B:
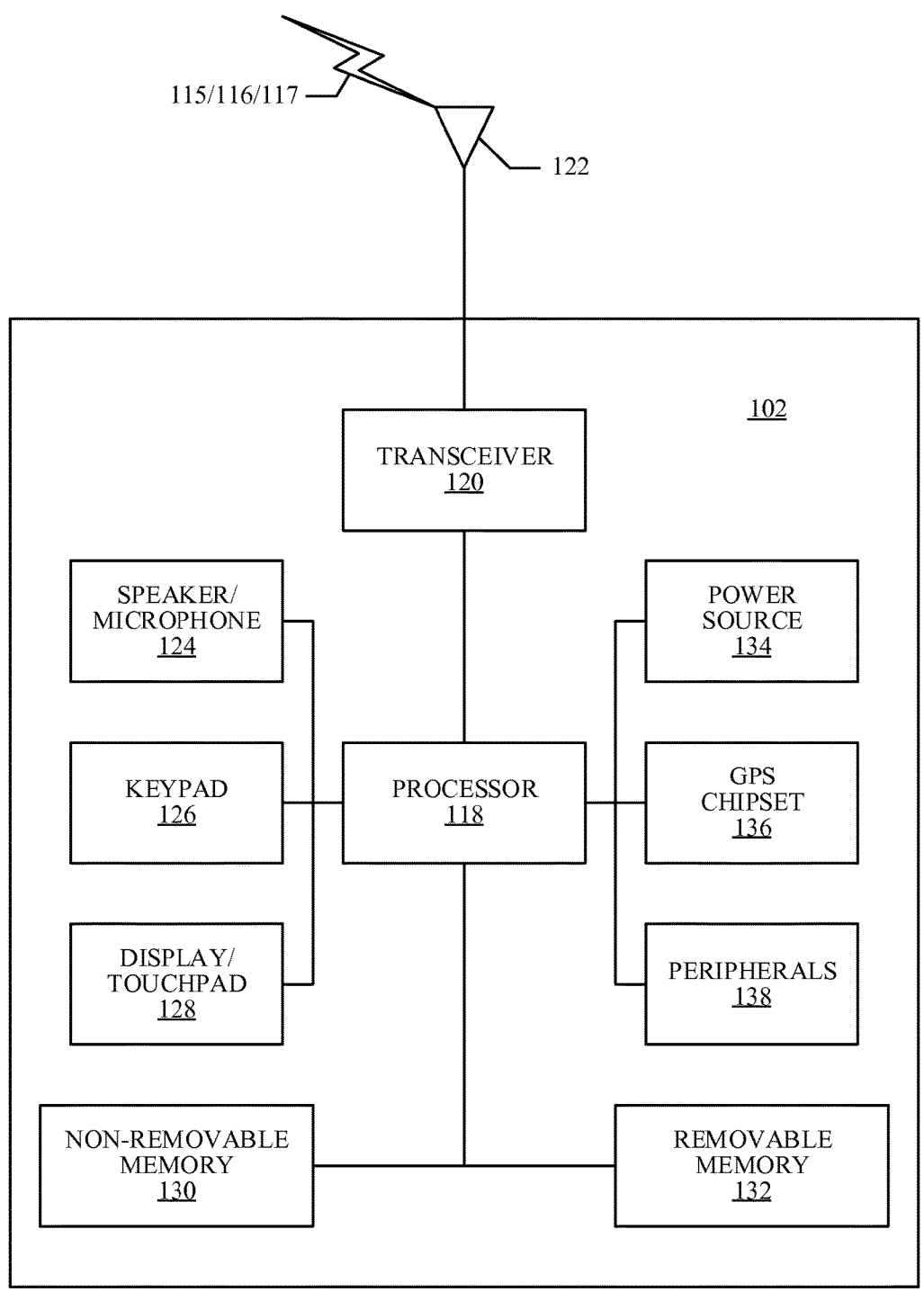
FIG. 1B depicts an example wireless transmit/receive unit (WTRU) that may be used within the example communications system of FIG. 1A.

FIG. 1B depicts an example WTRU that may be used within the example communication system 100 of FIG. 1A. The example WTRU 102 includes a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that either or both of the base stations 114a and 114b may represent, such as but not limited to a BTS, a NodeB, a home NodeB, an evolved NodeB (eNodeB), a Home evolved NodeB (HeNB), an HeNB gateway, a site controller, an access point, a proxy node, among others, may include some or all of the elements depicted in FIG. 1B and described herein.

In at least one embodiment, the processor 118 is or at least includes one or more instances of one or more of the following: general-purpose processors, special-purpose processors, digital signal processors (DSPs), microprocessors (e.g., with a DSP core), controllers, microcontrollers, ASICs, FPGAs, other types of integrated circuits (ICs), state machines, and the like. The processor 118 may perform signal coding, data processing, power control, input/output processing, and/or any other functions that enable the WTRU 102 to operate in a wireless environment. In at least one embodiment, the processor 118 is coupled to the transceiver 120, which in turn is coupled to the transmit/receive element 122. And though FIG. 1B depicts the processor 118 and the transceiver 120 as separate components, they could be integrated together, as known in the art.

In at least one embodiment, the transmit/receive element 122 is configured to transmit signals to and receive signals from a base station (e.g., the base station 114a) over the air interface 115/116/117. In one embodiment, the transmit/receive element 122 is or includes an antenna that is configured to transmit and/or receive RF signals. In another embodiment, the transmit/receive element 122 is or includes an emitter/detector that is configured to transmit and/or receive IR, UV, or visible-light signals, and/or the like. In yet another embodiment, the transmit/receive element 122 is configured to transmit and receive both RF and light signals. It will be appreciated that the transmit/receive element 122 may be configured to transmit and/or receive any combination of wireless signals. Moreover, although the WTRU 102 is depicted in FIG. 1B as including a single transmit/receive element 122, the WTRU 102 may include any number of transmit/receive elements 122. As an example, the WTRU 102 may employ MIMO technology, and in an embodiment includes multiple transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate in accordance with multiple RATs, such as UTRA and IEEE 802.11, as examples.

In various different embodiments, the processor 118 is coupled to and receives user-input data from the speaker/microphone 124, the keypad 126, and/or the display/touchpad 128 (which may include a liquid crystal display (LCD), an organic light-emitting diode (OLED), and/or the like). In various different embodiments, the processor 118 outputs user data to the speaker/microphone 124, the keypad 126, and/or the display/touchpad 128. Moreover, the processor 118 may access data from and store data in any type of suitable memory, such as the non-removable memory 130 and/or the removable memory 132. The non-removable memory 130 may include one or more of random access memory (RAM), read only memory (ROM), a hard disk, and the like. The removable memory 132 may include one or more of a subscriber identity module (SIM) card, a memory stick, a secure digital (SD) memory card, and the like. In some embodiments, the processor 118 accesses data from and stores data in memory that is not physically located on the WTRU 102, such as on a server or a home computer (not shown), as just a few examples.

The processor 118 may receive power from the power source 134, and may be configured to distribute and/or control the distribution of that power to one or more of the other components of the WTRU 102. The power source 134 may be any suitable device for powering the WTRU 102, some examples including dry-cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the WTRU 102. In addition to, or perhaps in lieu of, the information from the GPS chipset 136, the WTRU 102 may receive location information over the air interface 115/116/117 from one or more base stations and/or may determine its location based on the timing of various signals from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. As examples, the peripherals 138 may include one or more of an accelerometer, an e-compass, a satellite transceiver, a digital camera (for photographs or video), a universal serial bus (USB) port, a vibration device, a television transceiver, a hands-free headset, a Bluetooth® module, a frequency modulated (FM) radio unit, a digital music player, a media player, a video game player module, a web browser, and the like.

Figure 1C:
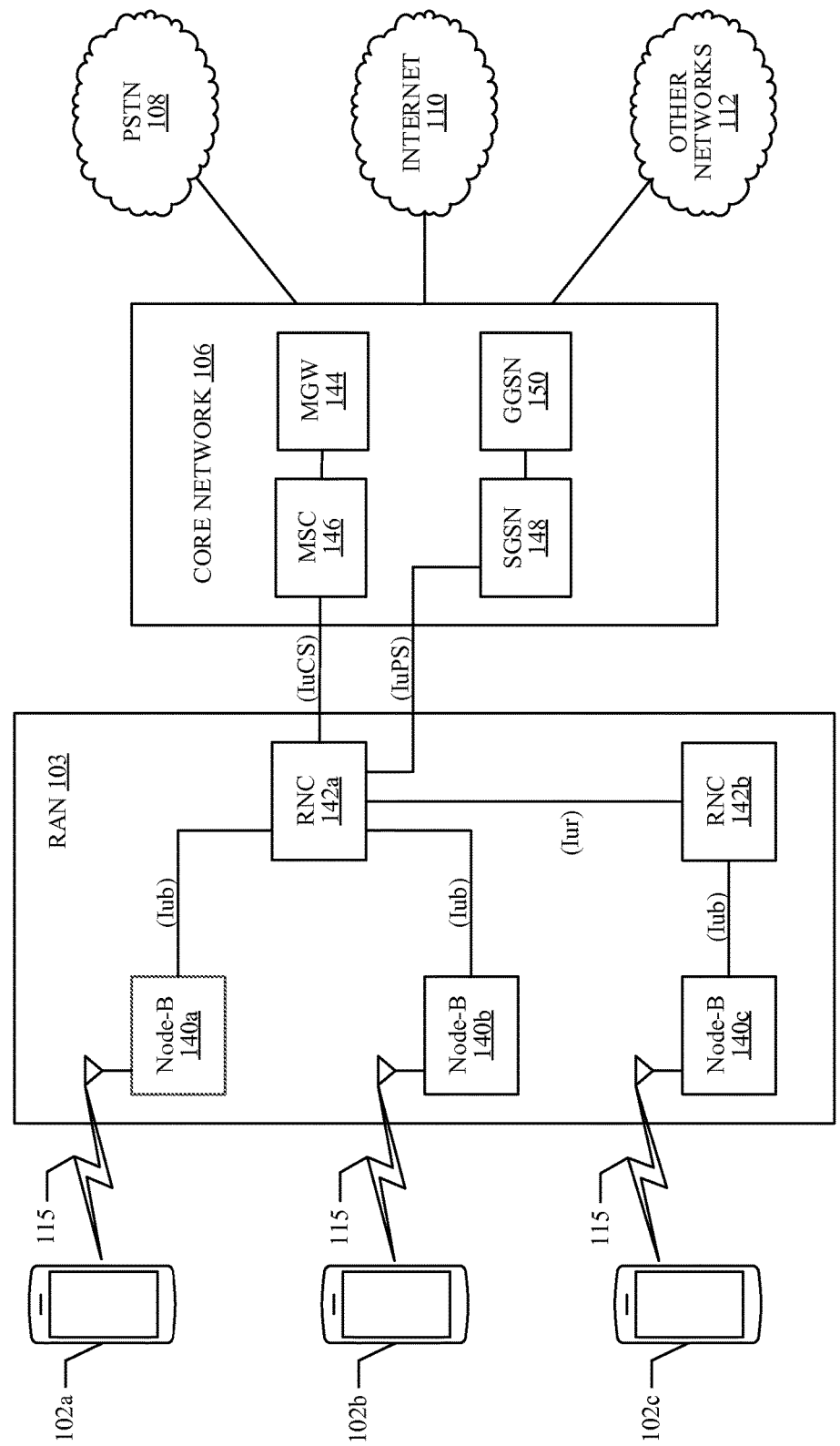
FIG. 1C depicts a first example radio access network (RAN) and a first example core network that may be used within the example communications system of FIG. 1A.

FIG. 1C depicts a first example RAN and a first example core network that may be used within the example communication system 100 of FIG. 1A. As noted, the RAN 103 may employ a UTRA radio technology to communicate with the WTRUs 102a-c over the air interface 115. In the depicted embodiment, the RAN 103 is in communication with the core network 106 and includes NodeBs 140a-c that may each include one or more transceivers for communicating with the WTRUs 102a-c over the air interface 115. The NodeBs 140a-c may each be associated with a particular cell (not shown) within the RAN 103. In the depicted embodiment, the RAN 103 also includes RNCs 142a-b. Moreover, those of skill in the relevant art will appreciate that the RAN 103 may include any number of NodeBs and RNCs while remaining consistent with an embodiment.

In the depicted embodiment, the NodeBs 140a-b communicate with the RNC 142a, and the NodeB 140c communicates with the RNC 142b. The NodeBs 140a-c communicate with the respective RNCs 142a-b via an Iub interface, and the RNCs 142a-b communicate with each other via an Iur interface. Each of the RNCs 142a-b may be configured to control the respective NodeBs 140a-c to which it is connected, and may also be configured to carry out or at least support other functions such as outer-loop power control, load control, admission control, packet scheduling, handover control, macrodiversity, security functions, data encryption, and the like.

In the depicted embodiment, the core network 106 includes a media gateway (MGW) 144, a mobile switching center (MSC) 146, a serving GPRS support node (SGSN) 148, and a gateway GPRS support node (GGSN) 150. And although each of those elements is depicted as being part of the core network 106, it will be appreciated that one or more of these elements could be owned and/or operated by an entity other than that which operates the core network 106.

In the depicted embodiment, the RNC 142a is connected via an IuCS interface to the MSC 146, which in turn is connected to the MGW 144. The MSC 146 and the MGW 144 cooperate to provide the WTRUs 102a-c with access to circuit-switched networks such as the PSTN 108. In addition, the RNC 142a is connected via an IuPS interface to the SGSN 148, which in turn is connected to the GGSN 150. The SGSN 148 and the GGSN 150 cooperate to provide the WTRUs 102a-c with access to packet-switched networks such as the Internet 110. And as noted, the core network 106 may also be connected to the other networks 112, which may include other wired and/or wireless networks that may be respectively owned and/or operated by one or more service providers other than that which owns and/or that which operates the core network 106.

Figure 1D:
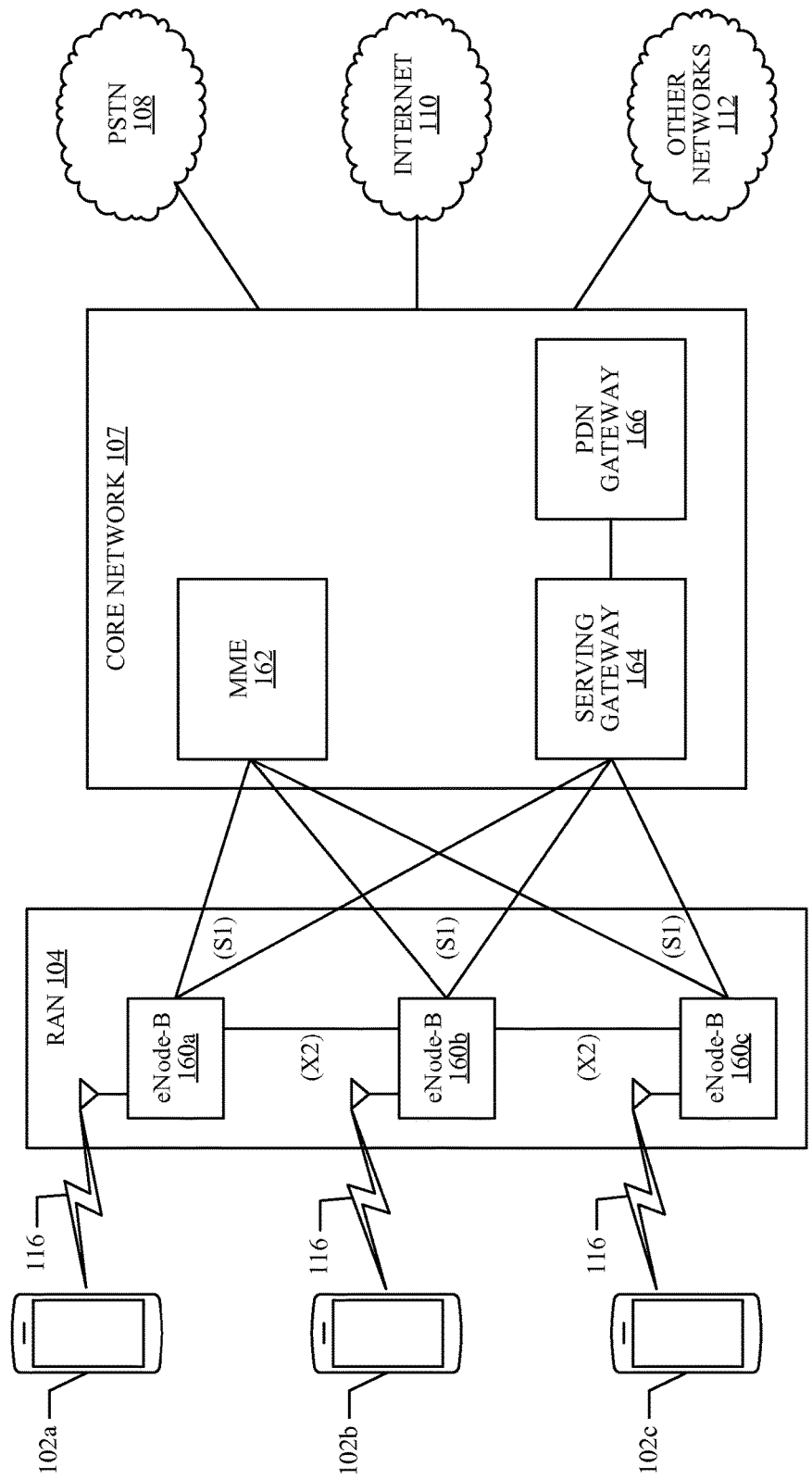
FIG. 1D depicts a second example RAN and a second example core network that may be used within the example communications system of FIG. 1A.

FIG. 1D depicts a second example RAN and a second example core network that may be used within the example communication system 100 of FIG. 1A. As noted, the RAN 104 may employ an E-UTRA radio technology to communicate with the WTRUs 102a-c over the air interface 116. In the embodiment that is depicted in FIG. 1D, the RAN 104 is in communication with the core network 107 and includes eNodeBs 160a-c, though it will be appreciated that the RAN 104 may include any number of eNodeBs. Each of the eNodeBs 160a-c may include one or more transceivers for communicating with the WTRUs 102a-c over the air interface 116. In one embodiment, the eNodeBs 160a-c implement MIMO technology, each using multiple antennas to transmit wireless signals to and receive wireless signals from the WTRUs 102a-c.

Each of the eNodeBs 160a-c may be associated with a particular cell (not shown) and may be configured to handle radio-resource-management decisions, handover decisions, scheduling of users in the uplink and/or downlink, and the like. As shown in FIG. 1D, the eNodeBs 160a-c may communicate with one another over an X2 interface.

In at least one embodiment, the core network 107 includes a mobility management entity (MME) 162, a serving gateway 164, and a packet data network (PDN) gateway 166. And although each of those elements is depicted as being part of the core network 107, it will be appreciated that one or more of these elements could be owned and/or operated by an entity other than that which operates and/or that which owns the core network 107.

In the depicted embodiment, the MME 162 is connected to each of the eNodeBs 160a-c via an S1 interface; the MME 162 may serve as a control node that provides functions such as authentication, bearer activation and deactivation, selection of serving gateways during initial-attach procedures, and the like. In some embodiments, the MME 162 provides a control-plane function for switching between the RAN 104 and other RANs (not shown) that employ other RATs.

In the depicted embodiment, the serving gateway 164 is connected to each of the eNodeBs 160a-c via an S1 interface, and in general may route and forward user data packets to and from the WTRUs 102a-c. The serving gateway 164 may also carry out other functions such as anchoring user planes during inter-eNodeB handovers, triggering paging when downlink data is available for the WTRUs 102a-c, managing and storing contexts of the WTRUs 102a-c, and the like. The serving gateway 164 is also connected to the PDN gateway 166, which may provide the WTRUs 102a-c with access to packet-switched networks such as the Internet 110.

Indeed, in various embodiments, the core network 107 facilitates communications between the WTRUs 102a-c and circuit-switched networks such as the PSTN 108 (via, e.g., an IP multimedia subsystem (IMS)), packet-switched networks such as the Internet 110, and/or other networks 112, which may include other wired and/or wireless networks that may be respectively owned and/or operated by one or more service providers other than that which owns and/or that which operates the core network 107.

Figure 1E:
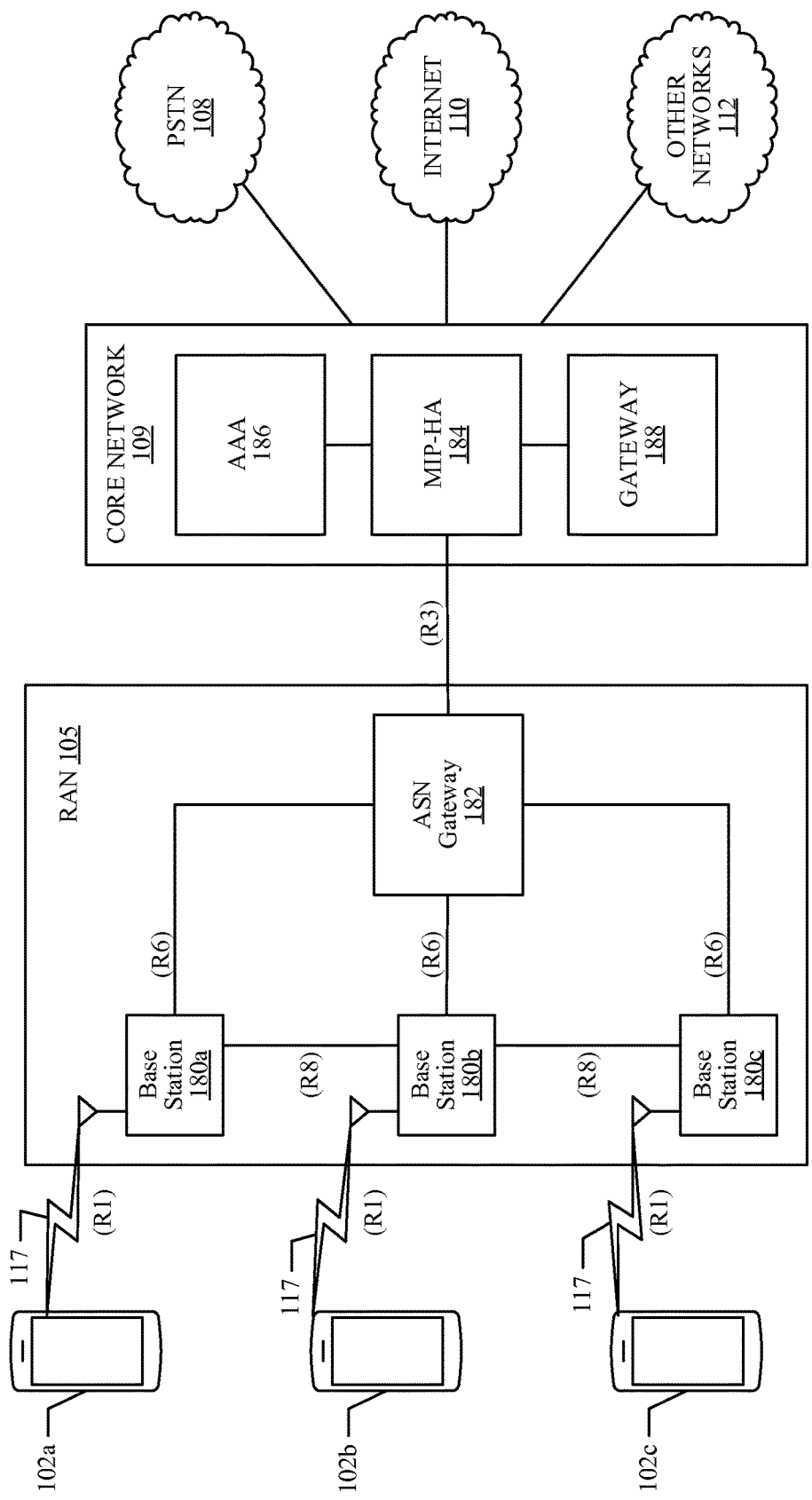
FIG. 1E depicts a third example RAN and a third example core network that may be used within the example communications system of FIG. 1A.

FIG. 1E depicts a third example RAN and a third example core network that may be used within the example communications system 100 of FIG. 1A. In an embodiment, the RAN 105 is an access service network (ASN) that employs IEEE 802.16 radio technology to communicate with the WTRUs 102a-c over the air interface 117. As is further discussed below, the communication links between the different functional entities of the WTRUs 102a-c, the RAN 105, and the core network 109 may be defined as reference points, as known to those of skill in the relevant art.

In the embodiment that is depicted in FIG. 1E, the RAN 105 includes base stations 180a-c and an ASN gateway 182, though it will be appreciated that the RAN 105 may include any number of base stations and ASN gateways. Each of the base stations 180a-c may be associated with a particular cell (not shown) in the RAN 105, and each may include one or more transceivers for communicating with the WTRUs 102a-c over the air interface 117. In at least one embodiment, the base stations 180a-c implement MIMO technology, each using multiple antennas to transmit wireless signals to and receive wireless signals from the WTRUs 102a-c. In various different embodiments, the base stations 180a-c also provide one or more mobility-management functions such as handoff triggering, tunnel establishment, radio-resource management, traffic classification, quality-of-service (QoS) policy enforcement, and the like. In at least one embodiment, the ASN gateway 182 serves as a traffic-aggregation point and may provide one or more functions such as paging, caching of subscriber profiles, routing to the core network 109, and the like.

In at least one embodiment, the air interface 117 is defined as an R1 reference point that implements the IEEE 802.16 specification, and each of the WTRUs 102a-c establish a logical interface (not shown) with the core network 109, where that logical interface may be defined as an R2 reference point (not shown) and may be used for one or more functions such as authentication, authorization, IP-host-configuration management, mobility management, and the like.

In the depicted embodiment, the link between each of the base stations 180a-c is defined as an R8 reference point that includes protocols for facilitating functions such as WTRU handovers, the transfer of data between base stations, and the like. The link between each respective base station 180a-c and the ASN gateway 182 is defined as an R6 reference point that includes protocols for facilitating mobility management based on mobility events associated with the WTRUs 102a-c.

In the embodiment that is depicted in FIG. 1E, the RAN 105 is connected to the core network 109 via a link that is defined as an R3 reference point that includes protocols for facilitating data transfer and mobility-management capabilities, as examples. In the depicted embodiment, the core network 109 includes a mobile-IP home agent (MIP-HA) 184, an authentication, authorization, and accounting (AAA) server 186, and a gateway 188. And although each of those elements is depicted as being part of the core network 109, it will be appreciated that one or more of these elements could be owned and/or operated by an entity other than that which operates and/or that which owns the core network 109.

In at least one embodiment, the MIP-HA 184 carries out one or more functions such as IP-address management, enabling roaming between different ASNs and/or different core networks, providing access to packet-switched networks such as the Internet 110, and the like. In at least one embodiment, the AAA server 186 carries out one or more functions such as user authentication, supporting user services, and the like. In at least one embodiment, the gateway 188 facilitates interworking with circuit-switched networks such as the PSTN 108, packet-switched networks such as the Internet 110, and other networks 112, which may include other wired and/or wireless networks that may be respectively owned and/or operated by one or more service providers other than that which owns and/or that which operates the core network 109.

Furthermore, although not depicted as such in FIG. 1E, those of skill in the art will appreciate that the RAN 105 may be connected to other ASNs, and that the core network 109 may be connected to other core networks. In at least one embodiment, a link between the RAN 105 and another ASN would be defined as an R4 reference point that includes protocols for functions such as coordinating mobility between the RAN 105 and the other ASN. And in at least one embodiment, a link between the core network 109 and another core network would be defined as an R5 reference point that includes protocols for functions such as facilitating interworking between home core networks and visited core networks.

Figure 1F:
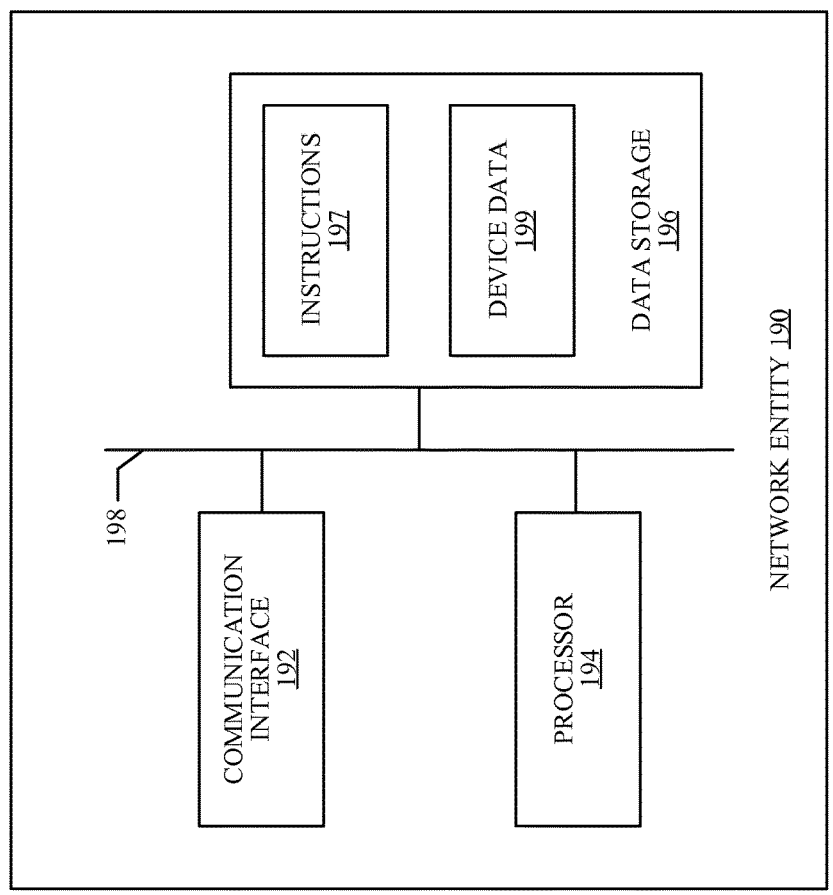
FIG. 1F depicts an example network entity that may be used within the example communication system of FIG. 1A.

FIG. 1F depicts an example network entity that may be used within the example communication system 100 of FIG. 1A. As depicted in FIG. 1F, the network entity 190 includes a communication interface 192, a processor 194, and non-transitory data storage 196, all of which are communicatively linked by a bus, network, or other communication path 198. The network entity 190 is provided as an example of the architecture, structure, arrangement, and the like that any of the entities described in connection with FIGS. 1A-1E could take.

The communication interface 192 may include one or more wired-communication interfaces and/or one or more wireless-communication interfaces. With respect to wired communication, the communication interface 192 may include one or more interfaces such as Ethernet interfaces, as an example. With respect to wireless communication, the communication interface 192 may include components such as one or more antennae, one or more transceivers and/or chipsets designed and configured for one or more types of wireless communication (e.g., LTE, Wi-Fi, and/or the like), and/or any other components deemed suitable by those of skill in the relevant art. And further with respect to wireless communication, the communication interface 192 may be equipped at a scale and with a configuration appropriate for acting on the network side, as opposed to the client side, of wireless communications. Thus, in at least one embodiment, the communication interface 192 includes the appropriate equipment and circuitry for serving multiple WTRUs.

The processor 194 may include one or more processors of any type deemed suitable by those of skill in the relevant art, some examples including a general-purpose microprocessor and a dedicated DSP. The data storage 196 may take the form of any non-transitory computer-readable medium or combination of such media, some examples including flash memory, ROM, and RAM to name but a few, as any one or more types of non-transitory data storage deemed suitable by those of skill in the relevant art could be used. As depicted in FIG. 1F, the data storage 196 contains program instructions 197 executable by processor 194 for carrying out various combinations of the various network-entity functions described herein, and also contains device data 199, which may include or one or more instances of one or more of any type or types of data deemed suitable by those of skill in the relevant art to facilitate the operation of the network entity 190.

The next portion of the disclosure includes description of FIGS. 2-7, which in general depict various system embodiments and various method embodiments.

Figure 2:
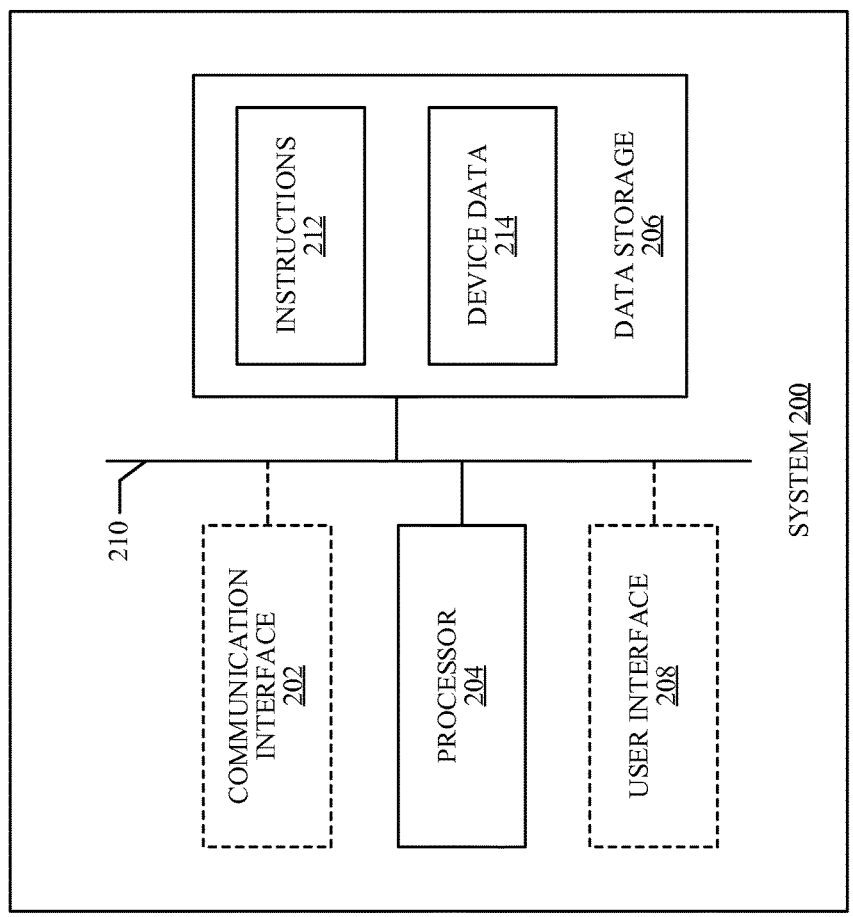
FIG. 2 depicts a first view of an example system, in accordance with at least one embodiment.

FIG. 2 depicts a first view of an example system, in accordance with at least one embodiment. In particular, FIG. 2 depicts an architectural view of an example system 200 that itself represents a system embodiment, and that could be arranged, programmed, and configured to carry out one or more method embodiments. As can be seen in FIG. 2, the example system 200 includes a communication interface 202, a processor 204, a non-transitory data storage 206, and a user interface 208, all of which are communicatively coupled with one another via a system bus (or other suitable connection, network, and/or the like) 210. It is noted that the example system 200 could be implemented in a single device but could just as well be implemented across multiple devices. It is further noted that both the communication interface 202 and the user interface 208 are depicted using dashed lines rather than solid lines to explicitly indicate that both of these are optional components—i.e., that in at least one embodiment the system 200 does not include the communication interface 202, in at least one embodiment the system 200 does not include the user interface 208, and in at least one embodiment the system 200 includes neither.

In various different embodiments, the communication interface 202 includes one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like), and in general includes any necessary hardware (e.g., chipsets, antennas, Ethernet cards, and/or the like), any necessary firmware, and any necessary software for communicating with one or more other entities as described herein.

In various different embodiments, the processor 204 includes one or more processors of any type deemed suitable by those of skill in the art, some examples including a general-purpose microprocessor and a dedicated DSP.

In various different embodiments, the data storage 206 includes one or more instances of any suitable non-transitory computer-readable medium or media, some examples including flash memory, ROM, and RAM to name but a few, as any one or more types of non-transitory data-storage deemed suitable by those of skill in the relevant art could be used. As depicted in FIG. 2, the data storage 206 contains program instructions 212 executable by the processor 204 for carrying out various functions described herein in connection with various embodiments, and also contains device data 214, which may include one or more instances of one or more types of data deemed suitable by those of skill in the art to facilitate the operation of the example system 200.

The user interface 208 may include one or more input devices (a.k.a. components and the like) and/or one or more output devices. With respect to input devices, the user interface 208 may include one or more touchscreens, buttons, switches, microphones, and the like. With respect to output devices, the user interface 208 may include one or more displays, speakers, light emitting diodes (LEDs), and the like. Moreover, one or more components (e.g., an interactive touchscreen-and-display component) of the user interface 208 could provide both user-input and user-output functionality. And certainly other user-interface components could be implemented in a given context, as known to those of skill in the art.

Figure 3:
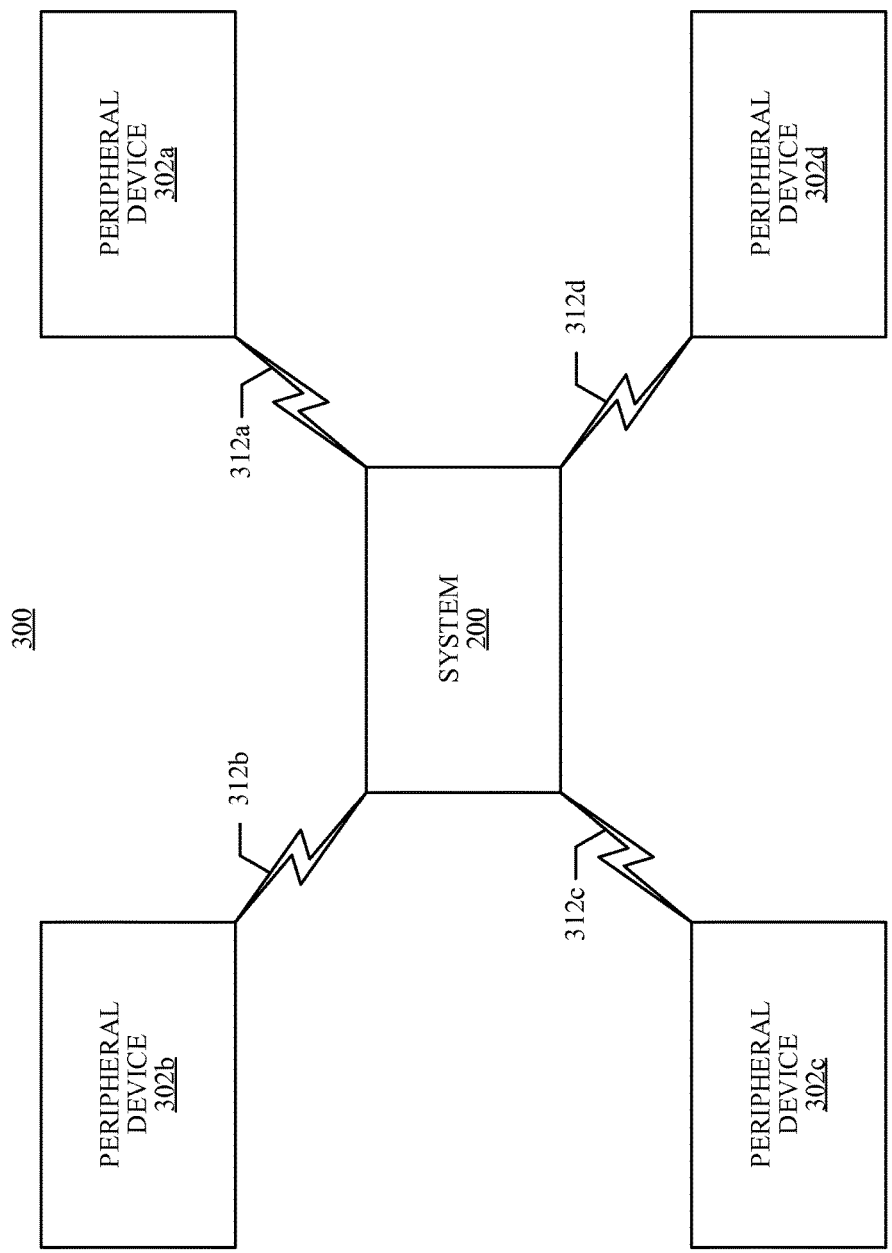
FIG. 3 depicts the example system of FIG. 2 in communication with multiple peripheral devices, in accordance with at least one embodiment.

FIG. 3 depicts the example system 200 of FIG. 2 in communication with multiple peripheral devices, in accordance with at least one embodiment. In the embodiment that is depicted in FIG. 3, the example system 200 is communicatively connected to peripheral devices 302a-d via respective communication links (i.e., data connections) 312a-d. One or more of the peripheral devices 302a-d may have an architecture similar to that described above in connection with the example system 200 of FIG. 2. One or more of the peripheral devices 302a-d may include (i) one or more sensors and/or one or more other data-gathering devices (e.g., a video camera) and (ii) one or more communication interfaces.

As examples, the peripheral device 302a could be a bracelet-like device that includes a sensor for measuring a pulse of a user, the peripheral device 302b could include a blood-pressure sensor, the peripheral device 302c could include a galvanic skin-conductivity sensor, and the peripheral device 302d could include an accelerometer. And certainly many other examples could be listed. Moreover, a given peripheral device 302a-d could include more than one sensor, data-gathering device (e.g., a video camera), and/or the like. Moreover, each of the communication links 312a-d may include one or more wired-communication (e.g., USB) segments and/or one or more wireless-communication (e.g., Bluetooth®) segments. And certainly other example architectures and arrangements could be implemented in various different contexts by those having skill in the relevant art.

Figure 4:
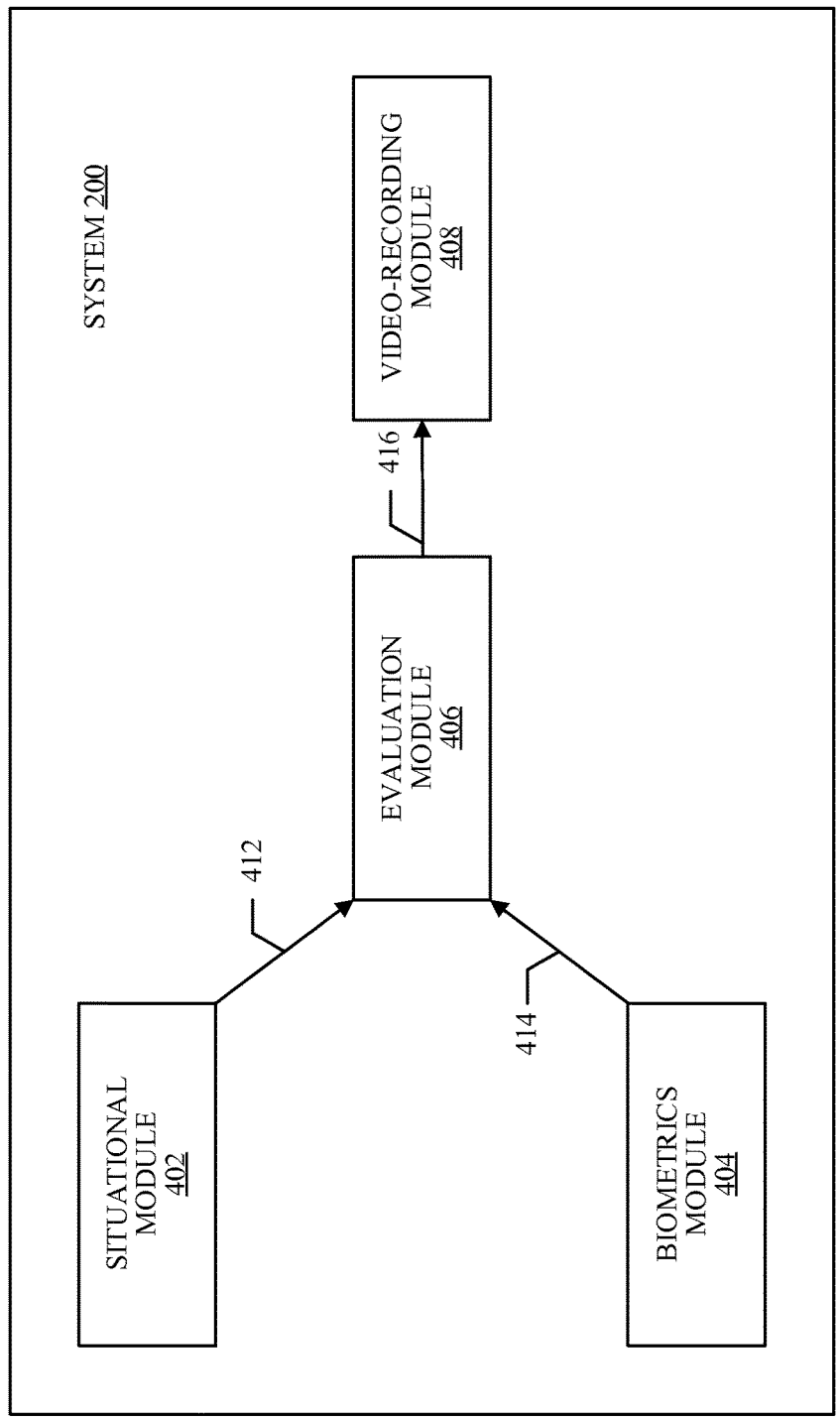
FIG. 4 depicts a second view of the example system of FIG. 2, in accordance with at least one embodiment.

FIG. 4 depicts a second view of the example system 200 of FIG. 2, in accordance with at least one embodiment. In particular, FIG. 4 depicts a functional view (whereas FIG. 2 depicted an architectural view) of the example system 200. As depicted in FIG. 4, the system 200 includes a situational module 402, a biometrics module 404, an evaluation module 406, and a video-recording module 408, each of which are further discussed below. As depicted, the evaluation module 406 is connected with the situational module 402 via a communication link 412 and with the biometrics module 404 via a communication link 414. The video-recording module 408 is connected with the evaluation module 406 via a communication link 416. Each of the links 412-416 may include one or more wired-communication segments and/or one or more wireless-communication segments. Modules 402-408 may be embodied in a single device or among a plurality of devices.

The situational module 402 is further discussed below in connection with FIG. 5, and in at least one embodiment is configured to carry out step 702 of the below-described method 700. The biometrics module 404 is further discussed below in connection with FIG. 6, and in at least one embodiment is configured to carry out step 706 of the method 700. In at least one embodiment, the evaluation module 406 is configured to carry out steps 704, 708, and 710. Moreover, in at least one embodiment, the evaluation module 406 and the video-recording module 408 are configured to cooperatively carry out step 712, which, as discussed below, involves initiating video recording when a derived interestedness score exceeds the current value of a stored interestedness threshold. Accordingly, in at least one embodiment, the evaluation module 406 is configured to transmit a video-recording-initiate command to the video-recording module 408 when the derived interestedness score exceeds the current value of the stored interestedness threshold, and the video-recording module 408 is configured to initiate video recording upon receipt of such a video-recording-initiate command.

Figure 5:
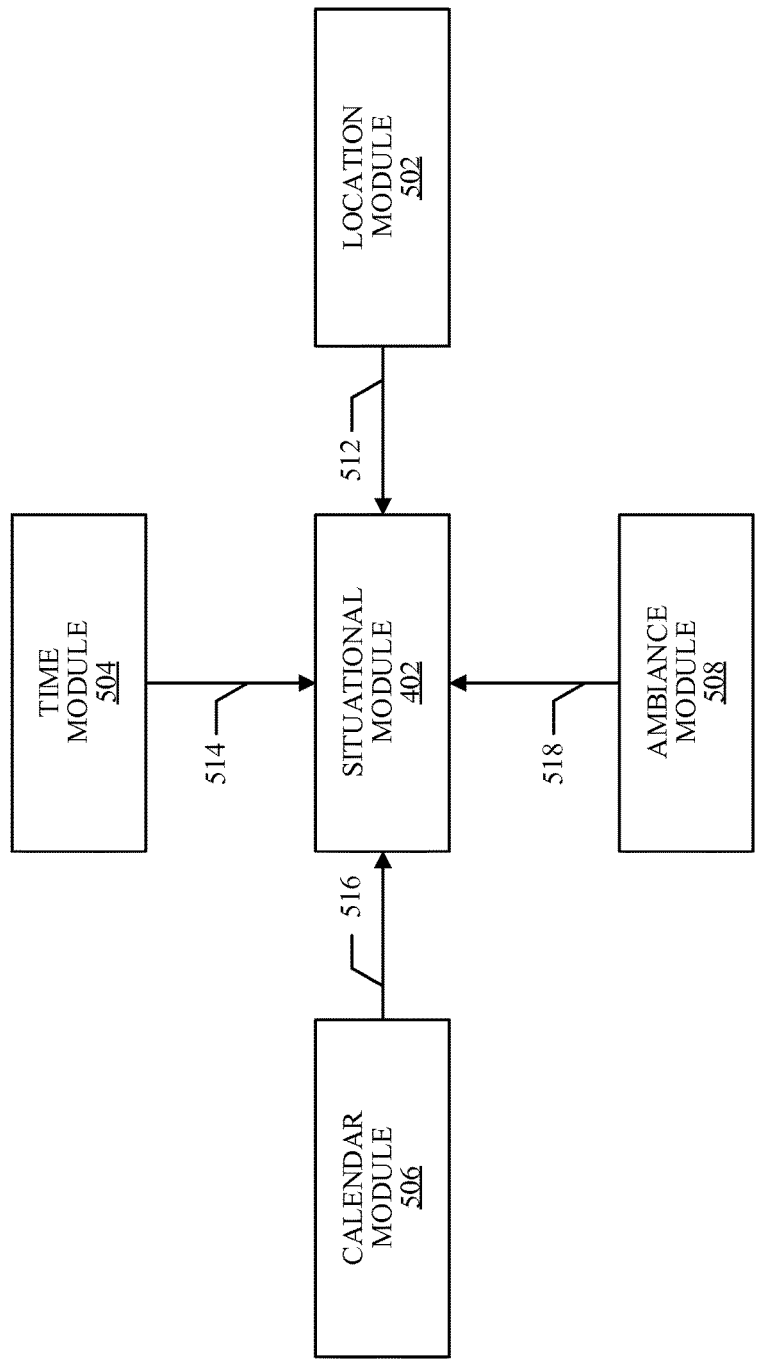
FIG. 5 depicts a first one of the modules of the example system of FIG. 2 (as that example system is depicted in FIG. 4), receiving information from multiple other modules, in accordance with at least one embodiment.

FIG. 5 depicts a first one of the modules of the example system 200 of FIG. 2 (as the system 200 is depicted in FIG. 4), receiving information from multiple other modules, in accordance with at least one embodiment. In particular, FIG. 5 depicts an example arrangement 500 in which the situational module 402 is connected with a location module 502 via a link 512, with a time module 504 via a link 514, with a calendar module 506 via a link 516, and with an ambiance module 508 via a link 518. Each of the modules 502-508 could be implemented as part of the system 200, as part of a peripheral device 302a-d, and/or as part of one or more other entities and/or devices, as deemed suitable by those of skill in the relevant art. Moreover, the modules 502-508 are provided by way of example, and in various different embodiments, one or more of those modules may not be present, as deemed suitable by those of skill in the relevant art in a given context. Moreover, as is the case with the other communication links mentioned herein, each of the links 512-518 may include one or more wired-communication segments and/or one or more wireless-communication segments.

The location module 502 may include a GPS device and/or one or more other devices that alone or together function to determine a current location, and to communicate that current location to the situational module 402. The time module 504 determines a current time (which may include a date, a day of the week, and/or the like), and communicates that current time to the situational module 402. The calendar module 506 accesses calendar data from one or more calendars (e.g., a user's personal calendar, work calendar, and the like), where such calendar data represents constructs such as meetings, appointments, attendees, start times, stop times, reminders, and the like, as is known to those of skill in the relevant art; the calendar module 506 also communicates that calendar data to the situational module 402. The ambiance module 508 may include a microphone and/or one or more other sensors, and functions to make determinations and/or gather data pertaining to a current environment in which a user is at a given moment; the ambiance module 508 also communicates those determinations and/or gathered data to the situational module 402; examples of information that the ambiance module 508 communicates to the situational module 402 in various different embodiments include a crowdedness level and a noisiness level, though certainly many other examples could be listed, as known to those of skill in the relevant art.

In some embodiments, the modules 502-508 may receive information from an external source. For example, the calendar module 506 may obtain event information from an e-mail account associated with a user of the system 200. The e-email account may include information relating to a meeting or event at a certain location and time. This information can be automatically communicated to the calendar module for forwarding to the situational module 402.

Figure 6:
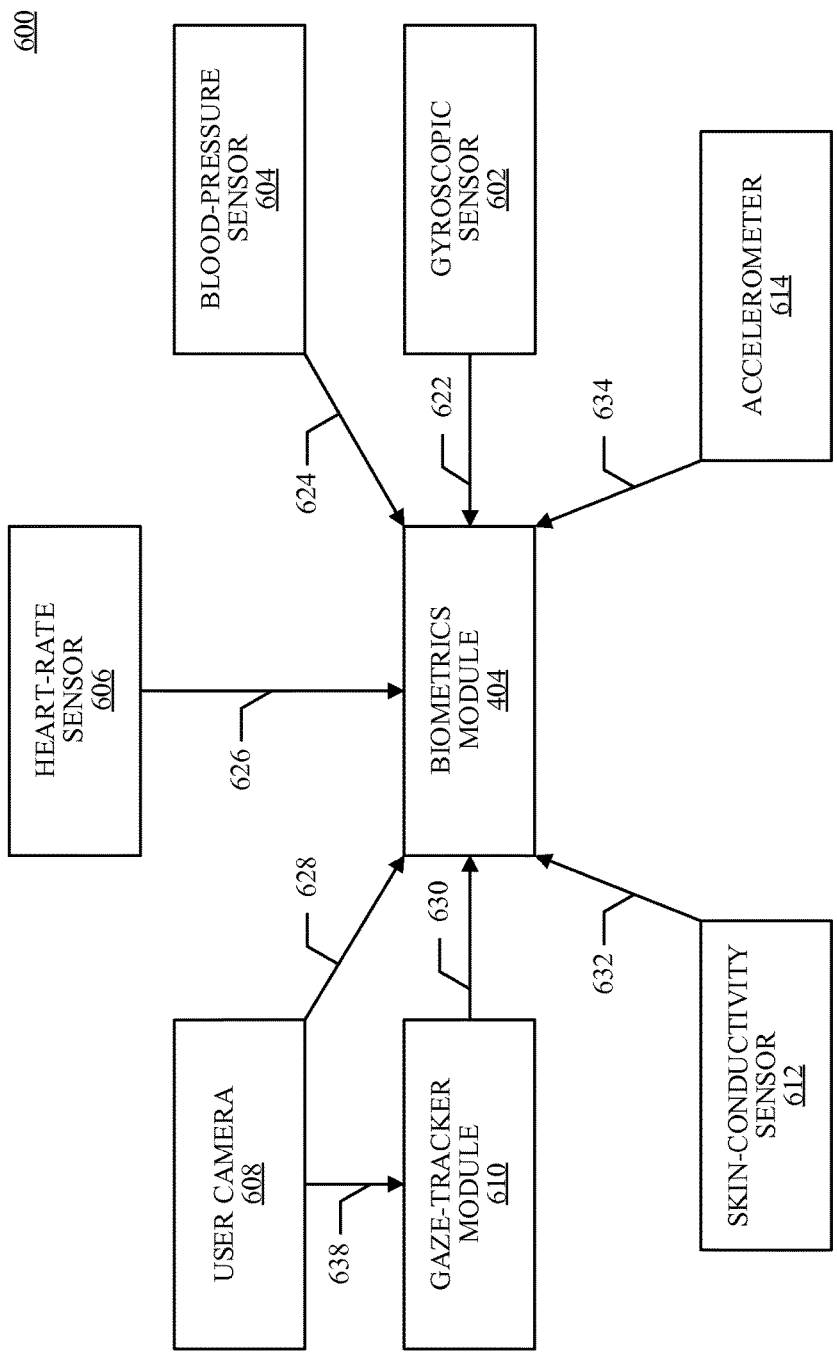
FIG. 6 depicts a second one of the modules of the example system of FIG. 2 (as that example system is depicted in FIG. 4), receiving information from multiple other modules, in accordance with at least one embodiment.

FIG. 6 depicts a second one of the modules of the example system 200 of FIG. 2 (as the system 200 is depicted in FIG. 4), receiving information from multiple other modules, in accordance with at least one embodiment. In particular, FIG. 6 depicts an example arrangement 600 in which the biometrics module 404 is connected with a gyroscopic sensor 602 via a link 622, with a blood-pressure sensor 604 via a link 624, with a heart-rate sensor 606 via a link 626, with a user camera 608 via a link 628, with a gaze-tracker module 610 via a link 630, with a skin-conductivity sensor 612 via a link 632, and with an accelerometer 614 via a link 634. Also, in the depicted embodiment, the gaze-tracker module 610 is connected with the user camera 608 via a link 638. For brevity and not by way of limitation, the sensors and other data-gathering devices 602-614 are collectively referred to at times herein as "the sensors 602-614," each of which could be implemented as part of the system 200, as part of a peripheral device 302a-d, and/or as part of one or more other entities and/or devices, as deemed suitable by those of skill in the relevant art. Moreover, the sensors 602-614 are provided by way of example, and in various different embodiments, one or more of those sensors may not be present, as deemed suitable by those of skill in the art. Moreover, as is the case with the other links mentioned herein, each of the links 622-638 may include one or more wired-communication segments and/or one or more wireless-communication segments.

The gyroscopic sensor 602 may include one or more gyroscopes and/or one or more other gyroscopic components, as known to those of skill in the relevant art; accordingly, in an embodiment, the gyroscopic sensor 602 functions to determine the spatial orientation (and/or one or more changes in the spatial orientation) of itself and therefore inferentially of the device in which it resides and/or of a user. In an embodiment, the gyroscopic sensor 602 communicates such determined information to the biometrics module 404.

The blood-pressure sensor 604 may include one or more components known to those of skill in the art for taking one or more measurements of the blood pressure of a user; in an embodiment, the blood-pressure sensor 604 communicates such determined information to the biometrics module 404.

The heart-rate sensor 606 may include one or more components known to those of skill in the art for taking one or more measurements of the heart rate (i.e., pulse) of a user; in an embodiment, the heart-rate sensor 606 communicates such determined information to the biometrics module 404.

The user camera 608 may include one or more cameras (e.g., one or more image-capturing cameras and/or one or more video-capturing cameras) trained towards the user of the example system 200. In some embodiments, the user camera 608 has a field of vision that includes one or both of the eyes of the user. In some embodiments, the user camera 608 has a field of vision that includes substantially all of the area of the face of the user (or at least enough of that area to recognize one or more facial expressions, pupil dilation, gestures, and/or the like). In an embodiment, the user camera 608 communicates such captured and/or determined data to the biometrics module 404. In at least one embodiment, the user camera 608 communicates some or all of its captured and/or determined data to the gaze-tracker module 610.

The gaze-tracker module 610 may include one or more communication interfaces for communicating with the user camera 608 over the link 638 and for communicating with the biometrics module 404 over the link 630. In an embodiment, the user camera 608 captures image and/or video data of one or both of a user's eyes, and transmits that data to the gaze-tracker module 610 via the link 638. The gaze-tracker module 610 may include one or more image-data and/or video-data processors for determining from such data where in a field of vision a user was looking (i.e., gazing) at a given moment and/or for a given duration of time (e.g., perhaps the user stared at a particular point in their field of vision for 10 consecutive seconds, likely indicating interest in whatever they were looking at). In an embodiment, the gaze-tracker module 610 communicates data indicative of one or more of such determinations to the biometrics module 404.

The skin-conductivity sensor 612 may include one or more components (e.g., one or more galvanic sensors) known to those of skill in the art for measuring the skin conductivity of a user; in an embodiment, the skin-conductivity sensor 612 further functions to communicate such determined information to the biometrics module 404.

The accelerometer 614 may include one or more components known to those of skill in the relevant art for taking one or more measurements of a spatial and/or rotational acceleration (and/or one or more changes in acceleration) of itself and therefore inferentially of the device in which it resides and/or of a user; in an embodiment, the accelerometer 614 further functions to communicate such determined information to the biometrics module 404.

Figure 7:
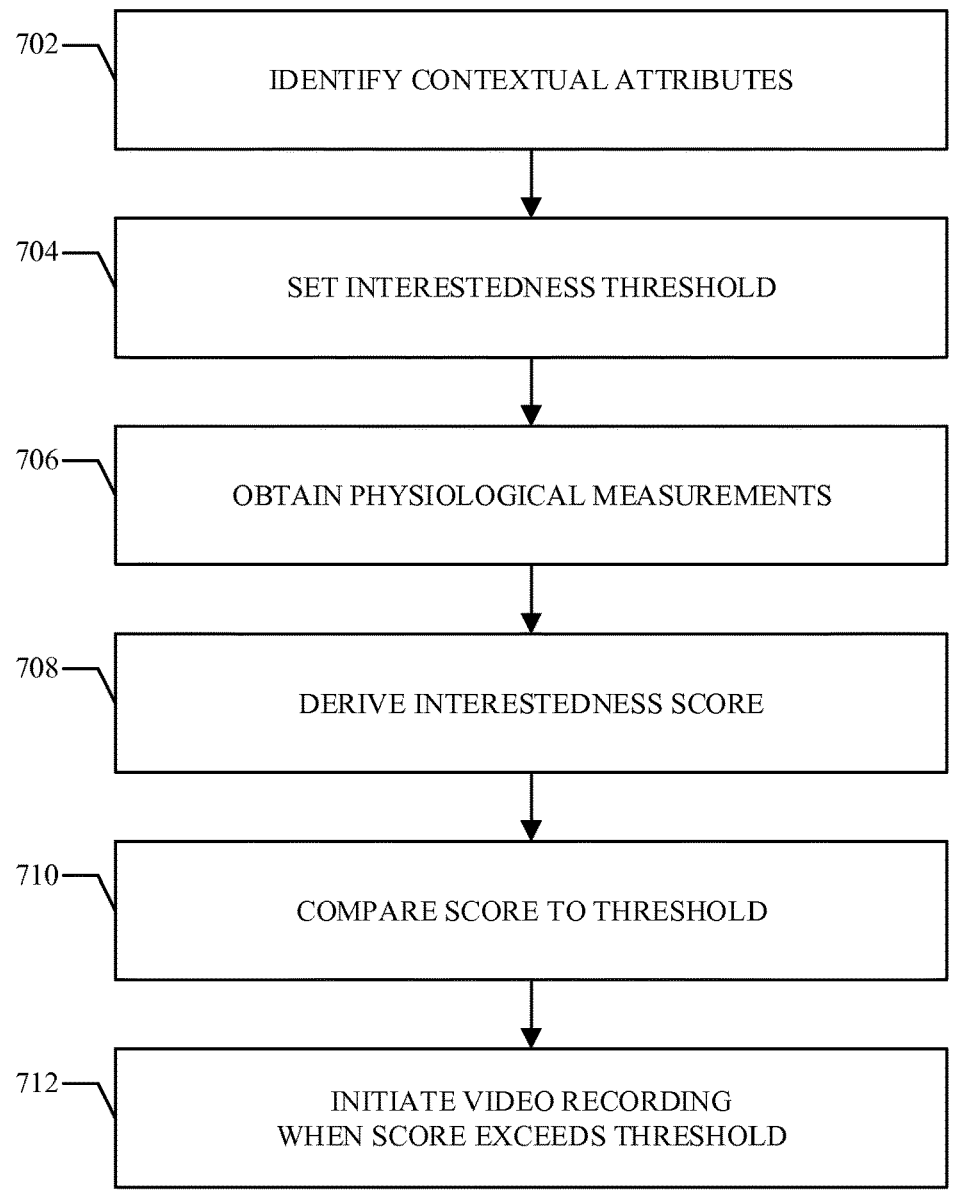
FIG. 7 depicts an example method, in accordance with at least one embodiment.

FIG. 7 depicts an example method, in accordance with at least one embodiment. In particular, FIG. 7 depicts a method 700 that, in the ensuing paragraphs, is described as being carried out by the above-discussed example system 200. This manner of description, however, is by way of example and not limitation, as those of skill in the relevant art will appreciate that the example method 700 could be carried out by any suitably equipped, programmed, and configured device or set of devices.

As depicted in FIG. 7, the example method 700 includes six steps 702-712. At step 702, the system 200 identifies one or more current contextual attributes of a current context of a user. At step 704, the system 200 sets a current value of a stored interestedness threshold based at least in part on the one or more identified current contextual attributes. At step 706, the system 200 obtains one or more current physiological measurements of the user. At step 708, the system 200 derives an interestedness score based at least in part on the one or more obtained current physiological measurements. At step 710, the system 200 compares the derived interestedness score to the current value of the stored interestedness threshold. Each of these steps is further discussed below.

At step 702, the system 200 identifies one or more current contextual attributes of a current context (i.e., situation, including but not limited to place, time, time of day, and/or the like) of a user. In at least one embodiment, the one or more current contextual attributes includes a current location. In such an embodiment, the system 200 may receive current-location data into the situational module 402 from the location module 502 via the link 512.

In at least one embodiment, the one or more current contextual attributes includes a noisiness level. In such an embodiment, the system 200 may receive current-noisiness data into the situational module 402 from the ambiance module 508 via the link 518. In an embodiment, the ambiance module 508 detects levels of ambient noise using a microphone and/or one or more other components deemed suitable by those of skill in the relevant art.

In at least one embodiment, the one or more current contextual attributes includes a crowdedness level, and the system 200 may receive current-crowdedness data into the situational module 402 from the ambiance module 508, which may infer a level of crowdedness of a user's surroundings in any number of ways, some examples including detecting a relatively high number of nearby WCDs, detecting a relatively high number of distinct voices, detecting a relatively low amount of oxygen in an indoor environment, detecting a relatively high temperature in an indoor environment, detecting a relatively high amount of ambient noise, and/or the like. In at least one embodiment, the system 200 infers crowdedness at least in part by analyzing image data and/or video data (that may show, e.g., a relatively high number and/or concentration of faces, people, and/or the like) captured by the video-recording module 408 and/or one or more other cameras. And certainly other examples of ways in which crowdedness could be inferred could be listed.

Further with respect to determination of crowdedness level, the video-recording module 408 and/or another component of the system 200 may detect the identities of distinct people, which could also or instead be identified using voice-recognition technology, perhaps as part of the functioning of the ambiance module 508. In at least one embodiment, the video-recording module 408 detects a person and further detects the person's mouth moving, indicating that the person is speaking. In such an embodiment, the ambiance module 508 may correlate the detected voice with the detected mouth movements. The ambiance module 508 may determine the identity of the detected person and include that determined identity in metadata associated with the video recording.

In at least one embodiment, the one or more current contextual attributes includes the detected identity of a distinct person. The identification may be facilitated by detection of the distinct person's voice and/or image. The distinct person detection may be further correlated (e.g., corroborated) with a calendar event that lists the event's attendees. And certainly other implementations are possible as well.

In at least one embodiment, the one or more current contextual attributes includes a stored calendar event, and the system 200 may receive stored-calendar-event data from the calendar module 506 via the link 516. This stored-calendar-event data may indicate that the corresponding stored calendar event has an associated scheduled start time (e.g., 6:00 p.m. on the current date) that is less than a first threshold amount of time (e.g., 10 minutes) after the current time (e.g., 5:51 p.m.); i.e., the user is likely about to be late (assuming that their current location is not the same as or sufficiently near the location of the calendar event such that the user is already there or is likely to be there on time, and/or the system 200 has received no other indication that the user is present at or not going to be late to the event).

In an embodiment, the system 200 receives time data into the situational module 402 from the time module 504, which may include a clock and/or a data connection to current-time information, and/or the like. In other situations, the stored-calendar-event data may indicate that the corresponding stored calendar event has an associated scheduled start time (e.g., 6:00 p.m. on the current date) that precedes the current time (e.g., 6:01 p.m.); i.e., the user is already late (assuming again that their current location is not the same as the location of the calendar event, and/or the system 200 has received no other indication that the user is present at the calendar event). In at least one embodiment, the stored-calendar-event data indicates that the corresponding stored calendar event has an associated priority level that exceeds a stored priority-level threshold. And certainly other possibilities could be listed.

At step 704, the system 200 sets a current value of a stored interestedness threshold based at least in part on the one or more identified current contextual attributes. In at least one embodiment, the current value of the stored interestedness threshold exceeds an immediately preceding value of the stored interestedness threshold (i.e., step 704 may involve increasing the interestedness threshold for the system 200). In at least one embodiment, the current value of the stored interestedness threshold is less than an immediately preceding value of the stored interestedness threshold (i.e., step 704 may involve decreasing the interestedness threshold for the system 200). Moreover, the system 200 may implement its interestedness threshold using any numerical scale, numerical values, and the like deemed suitable by those of skill in the relevant art. In some embodiments, the interestedness threshold is set equal to an integer (e.g., 10); in other embodiments, the interestedness threshold is set equal to a midpoint between two integers (e.g., 10.5). And certainly many other possible examples could be listed as well.

In some embodiments, the system 200 may carry out step 704 at least in part by adjusting a particular value (e.g., a default value, a previous value in a substantially iterative implementation, or the like) in light of the one or more current contextual attributes that were identified at step 702. In general, such adjustments to the interestedness threshold of the system 200 reflect that various contextual attributes often impact a user's measured physiological parameters for reasons that are independent of that user's level of interest in the scene at which they happen to currently be looking. Thus, in at least one embodiment, contextual attributes that tend to change physiological measurements in the same ways that heightened interest does drive the interestedness threshold up, while contextual attributes that tend to change physiological measurements in ways that are opposite of the impact that is typical of heightened interest drive the interestedness threshold down.

Table 1 below lists a number of example adjustments that could be made based on various contextual attributes identified by the system 200 at step 702. In various different embodiments, one or more of the "INCREASE" indications in Table 1 could correspond to increasing the interestedness threshold by 1 point, 2 points, and/or any other suitable values; and similarly for the "DECREASE" indications. And certainly other examples could be listed.

TABLE 1

| Identified Contextual Attribute | Corresponding Adjustment to Interestedness Threshold |
|---|---|
| Location = Home | DECREASE |
| Location = Work | INCREASE |
| Location = Amusement Park | INCREASE |
| Crowdedness = HIGH | INCREASE |
| Crowdedness = LOW | DECREASE |
| Noisiness = HIGH | INCREASE |
| Noisiness = LOW | DECREASE |
| Time = 5:00 p.m. | INCREASE |
| Time = 10:00 p.m. | DECREASE |
| Day = MONDAY | INCREASE |
| Day = SATURDAY | DECREASE |
| Calendar Status = About to be late | INCREASE |
| Calendar Status = Late | INCREASE |
| Calendar Status = High-Priority Event | INCREASE |
| Calendar Status = Low-Priority Event | DECREASE |
| Accelerometer Status = Running | INCREASE |
| Accelerometer Status = Stationary | DECREASE |

In some embodiments, the system 200 increases the interestedness threshold in response to making a determination that the user has previously canceled a sufficient number of system-initiated recordings in a sufficiently recent amount of time in contextual situations that sufficiently match the current set of contextual attributes. As such, and as but one example, the system 200 may increase the interestedness threshold if the following inequality is true (where the Cancellation Threshold could be any suitable threshold level):

$$\frac{\text{Recordings Cancelled in Preceding 300 Seconds}}{\text{Total Recordings in Preceding 300 Seconds}} > \text{Cancellation Threshold}$$

Similarly, in some embodiments, the system 200 decreases the interestedness threshold in response to making a determination that the user has previously initiated a sufficient number of recordings in a sufficiently recent amount of time in contextual situations that sufficiently match the current set of contextual attributes. As such, and as but one example, the system 200 may decrease the interestedness threshold if the following inequality is true (where the Initiation Threshold could be any suitable threshold level):

$$\frac{\text{Recordings Manually Initiated in Preceding 300 Seconds}}{\text{Total Recordings in Preceding 300 Seconds}} > \text{Initiation Threshold}$$

Moreover, it is noted that absolute numbers of canceled recordings or user-initiated recordings could be compared with corresponding thresholds instead or in addition, and that the ratios shown on the respective left side of the above two inequalities are presented here as examples and not by way of limitation.

In some embodiments, the system 200 decreases the interestedness threshold in response to making a determination that the user previously initiated a sufficient number of recordings in contextual situations that include detection of attributes associated with one or more distinct people. As such, and as but one example, the system 200 may decrease the interestedness threshold if the following inequality is true (where the Detection Threshold could be any suitable threshold level):

$$\frac{\text{Recordings Initiated in Preceding Detections}}{\text{Total Detections}} > \text{Detection Threshold}$$

At step 706, the system 200 obtains one or more current physiological measurements of the user. In at least one embodiment, the one or more current physiological measurements includes one or both of a current facial expression and a recently assumed posture. The system 200 may identify facial expressions and/or recent changes in facial expression using the user camera 608 as described above. The system 200 may identify posture and/or recent changes in posture (e.g., recently assumed postures) using one or more accelerometers in, e.g., a head-mounted wearable computer, though certainly other options could be implemented by those of skill in the relevant art. Moreover, and as also described above, in at least one embodiment, the one or more current physiological measurements obtained by the system 200 as at least part of carrying out step 706 indicate one or more of a current respiration rate, a current heart rate, a current blood-pressure level, a current level of skin conductivity, and a current body temperature.

Furthermore, with respect to one or more of the physiological measurements, the system 200 in some embodiments maintains multiple running averages. As one example, the system 200 may maintain three running averages of the readings of the heart rate sensor: a long-term running average of the heart rate of the user over the preceding hour, a medium-term running average of the heart rate of the user over the preceding 5 minutes, and a short-term running average of the heart rate of the user over the preceding 30 seconds. As a second example, the system 200 may maintain two running averages of the pupil dilation of the user: a long-term running average of the pupil dilation over the preceding 2 minutes and a short-term running average of the pupil dilation over the preceding 10 seconds. And certainly other examples could be listed involving different physiological measurements (i.e., measurements of different physiological parameters), different numbers of running averages for different physiological measurements, different durations with respect to one or more of the running averages, and so on, as deemed suitable by those of skill in the relevant art.

At step 708, the system 200 derives an interestedness score based at least in part on the one or more obtained current physiological measurements. In at least one embodiment, the system 200 carries out step 708 at least in part by using historical data of the user's physiological measurements to normalize the values of the one or more obtained current physiological measurements, in order to determine how high or low a particular reading is in comparison with how high that user's typical or average reading is for that parameter.

In at least one embodiment, the system 200 carries out step 708 at least in part by referencing correlation data that maps sets of one or more values of physiological measurements to respective interestedness scores. Thus, in some embodiments, the system 200 maintains or otherwise has access to correlation data (e.g., a data table) that maps values of individual physiological parameters to components of interestedness scores, and then sums those components when deriving an interestedness score for a user; in some embodiments, the system 200 maintains or otherwise has access to correlation data that maps sets of values of physiological measurements to particular corresponding interestedness scores. In either case, a given set of correlation data may use ranges of particular values as opposed to exact measurement amounts, as deemed suitable by those of skill in the art in a given context. In some implementations, one or more thresholds (e.g., as delineations of ranges) may be maintained in data storage with respect to various physiological measurements In some embodiments, with respect to one or more physiological measurements, the system 200 makes a determination as to whether each such measurement is in a HIGH state or in a LOW state (using, e.g., one threshold, two ranges, or the like). In some such embodiments, the system includes a certain number of points (e.g., 1, 2, 3, and/or the like) in the derived interestedness score for each such measurement that is determined to be HIGH; and in some such embodiments, the system 200 either ignores each measurement that is determined to be LOW (a.k.a. NORMAL), or may explicitly add a certain number of points (e.g., 0, −1, −2, −3, and/or the like) for each such measurement that is determined to be LOW. And certainly other example implementations could be listed.

As described above, in some embodiments, the system 200 maintains two running averages with respect to one or more physiological measurements; the example mentioned above was a long-term running average and a short-term running average for the pupil dilation of the user. In some such embodiments, the system considers that measurement to be HIGH when the short-term running average exceeds the long-term running average by more than 20% (or some other selected threshold); in all other cases, that measurement may be considered to be LOW (a.k.a. NORMAL). As above, the system 200 may add certain values (e.g., 1 point, 2 points, 3 points, and/or the like) to the derived interestedness score for any HIGH measurements of any such parameters. And certainly other examples could be listed.

As also described above, in some embodiments, the system 200 maintains three running averages with respect to one or more physiological measurements; the example mentioned above was a long-term running average, a medium-term running average, and a short-term running average for the heart rate of the user. In some such embodiments, the system 200 considers that measurement to have undergone a SPIKE event when the short-term running average exceeds the medium-term running average by more than 20% (or some other selected threshold); and in some such embodiments, the system 200 considers that measurement to be HIGH when the medium-term running average exceeds the long-term running average by more than 10% (or some other selected threshold); in all other cases, that measurement may be considered to be LOW (a.k.a. NORMAL). The system 200 may add a certain value (e.g., 2 points) to the derived interestedness score when such a measurement undergoes a SPIKE event, and may add a certain (same or different) value (e.g., 1 point) to the derived interestedness score when such a measurement is in a HIGH state; in all other cases, that measurement may be considered to be LOW (a.k.a. NORMAL). In this example as with the others, a LOW state could result in the system adding a zero value or a negative value to the derived interestedness score. And certainly other examples could be listed.

At step 710, the system 200 compares the derived interestedness score to the current value of the stored interestedness threshold, and at step 712, the system 200 initiates video recording when the derived interestedness score exceeds the current value of the stored interestedness threshold. As noted above, the function of initiating video recording takes various different forms in various different embodiments. In at least one embodiment, initiating video recording involves transitioning a video-recording function from an "off" state to an "on" state. In at least one embodiment, initiating video recording involves bookmarking one or more points in a video stream that is being continuously captured (i.e., where a video-recording function is always (or substantially always) in an "on" state). In at least one embodiment, initiating video recording involves bookmarking one or more points in a video stream that was manually initiated by a user. And certainly other examples could be listed as well, as known to those of skill in the relevant art.

In some embodiments, the system 200 derives a second interestedness score, compares the second interestedness score to a second threshold, and terminates video recording when the second interestedness score does not exceed the second threshold, which in at least one embodiment is equal to the stored interestedness threshold, and which in at least one embodiment is not. In at least one embodiment, the system 200 terminates video recording responsive to receiving a video-terminate command via a user interface. In at least one embodiment, the system 200 terminates video recording after a timeout period.

In at least one embodiment, the system 200 uses data from one or more of the situational module 402, the biometrics module 404 and the evaluation module 406 to create metadata associated with video data that is captured by the video-recording module 408. Metadata can include a variety of information such as, one or more interestedness scores, one or more interestedness thresholds, data regarding the determined context, readings from one or more sensors, examples of which can be viewed in FIG. 6, information generated by the evaluation module 406, and the like. In some embodiments the metadata can be associated with specific parts of the video data (e.g., the interestedness score that was determined by the system 200 when a given video frame or set of frames (i.e., scene) was captured by the video-recording module 408).

In such an embodiment, the metadata may be used to filter parts of the video data based on the associated metadata. Likewise, the metadata may be used to delete parts of the video data based on the associated metadata. In at least one embodiment, a user can use the metadata to filter the video data to show only video that was taken when the interestedness level was at or above a certain level. Similarly, in at least one embodiment a user can use the metadata to automatically delete video that was taken when the interestedness level was at or below a certain level.

In at least one embodiment, the system 200 captures and stores vision-focus data that reflects one or both of where and at what the user is looking at or about the time that they system 200 carries out step 706. In at least one such embodiment, the system 200 highlights where and/or at what the user was looking in the captured video data from that time. As such, if the system 200 determined that a user was interested enough in something (e.g., a particular person's face) to initiate video recording, the system 200 may also highlight in the video data the likely trigger of that interest. And certainly other examples could be listed.

Furthermore, various embodiments provide for user browsing and/or sharing of captured (and possibly highlighted) video data in the various different manners known to those of skill in the relevant art. Moreover, some embodiments, provide for (anonymously or non-anonymously, as deemed appropriate by those of skill in the relevant art for a given implementation or in a given context) aggregating data (e.g., at a network server) reflecting where multiple users were at a certain time when their respective associated systems all initiated video recording due to heightened interest levels of their respective users; such functionality may be helpful in identifying occurrences of potentially newsworthy events; in some such embodiments, aggregation of captured video data may occur as well, perhaps to inform the public and/or for one or more other purposes. And other examples could be listed.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in one or more non-transitory computer-readable media for execution by a computer or processor. Examples of non-transitory computer-readable media include, but are not limited to, ROM, RAM, a register, cache memory, semiconductor memory devices, magnetic media such as internal hard disks and removable disks, magneto-optical media, and optical media such as CD-ROM disks, and digital versatile disks (DVDs). One or more processors executing software may be used to implement at least in part an RF transceiver for use in any communication device such as a WCD, a WTRU, a UE, an access terminal, a base station, an RNC, a host computer, and the like.

What is claimed is:

1. A method, performed by a wearable computing device, comprising: identifying one or more current contextual attributes of a current context of a user; setting a current value of a stored interestedness threshold based at least in part on the one or more identified current contextual attributes, wherein setting the current value of the stored interestedness threshold comprises increasing the stored interestedness threshold based at least in part on a determination that the user has previously canceled a number of system-initiated video recordings; obtaining one or more current physiological measurements of the user; deriving an interestedness score based at least in part on the one or more obtained current physiological measurements; comparing the derived interestedness score to the current value of the stored interestedness threshold; and initiating video recording of a scene by the wearable computing device when the derived interestedness score exceeds the current value of the stored interestedness threshold.

2. The method of claim 1, wherein the one or more current contextual attributes comprises a current location of the user.

3. The method of claim 1, wherein the one or more current contextual attributes comprises a crowdedness level, wherein the crowdedness level is inferred based on analysis of a current environment of the user.

4. The method of claim 1, wherein the one or more current contextual attributes comprises an ambient noise level detected using a microphone.

5. The method of claim 1, wherein the one or more current contextual attributes comprises a stored calendar event, the stored calendar event having an associated scheduled start time that is less than a first threshold amount of time after a current time.

6. The method of claim 1, wherein the one or more current physiological measurements comprises one or both of a current facial expression and a recently assumed posture.

7. The method of claim 1, wherein the one or more current physiological measurements indicate one or more of a current respiration rate, a current heart rate, a current blood-pressure level, a current level of skin conductivity, and a current body temperature.

8. The method of claim 1, wherein deriving the interestedness score based at least in part on the one or more obtained current physiological measurements comprises using historical physiological measurements to normalize the one or more obtained current physiological measurements.

9. The method of claim 1, wherein deriving the interestedness score based at least in part on the one or more obtained current physiological measurements comprises referencing correlation data that maps sets of one or more values of physiological measurements to respective interestedness scores.

10. The method of claim 1, wherein deriving the interestedness score based at least in part on the one or more obtained current physiological measurements comprises comparing a short-term running average of a physiological measurement to a longer-term running average of the physiological measurement.

11. The method of claim 1, further comprising deriving a second interestedness score, comparing the second interestedness score to a second threshold, and terminating video recording when the second interestedness score does not exceed the second threshold.

12. The method of claim 1, wherein at least one of the one or more current physiological measurements is obtained from a sensor.

13. The method of claim 12, wherein the sensor comprises at least one of a heart-rate sensor, a skin-conductivity sensor, or a body temperature monitoring sensor, and wherein the sensor is part of a device worn by the user.

14. The method of claim 13, wherein the wearable computing device comprises the sensor and the device worn by the user.

15. The method of claim 1, wherein the one or more current contextual attributes comprises a detected identity of a person, and wherein the method further comprises: determining the detected identity of the person using detection of at least one of a voice of the person or an image of the person.

16. The method of claim 1, further comprising: identifying one or more adjustments to the interestedness threshold corresponding to the one or more identified current contextual attributes; and wherein setting the current value of the stored interestedness threshold based at least in part on the one or more identified current contextual attributes comprises setting the current value of the stored interestedness threshold based on the identified one or more adjustments to the interestedness threshold.

17. The method of claim 1, wherein setting the current value of the stored interestedness threshold comprises: adjusting the stored interestedness threshold to offset an impact that an identified current contextual attribute of the one or more identified current contextual attributes is expected to have on measured physiological parameters of the user.

18. The method of claim 1, wherein setting the current value of the stored interestedness threshold comprises: adjusting the stored interestedness threshold based at least in part on a determination that an identified contextual attribute of the one or more identified current contextual attributes has a value that has been associated with a tendency to change physiological measurements of a particular user independent of the particular user's level of interest in a particular scene.

19. A system comprising: one or more processors; and one or more non-transitory computer-readable media storing instructions that are executable by the one or more processors to: identify one or more current contextual attributes of a current context of a user; set a current value of a stored interestedness threshold based at least in part on the one or more identified current contextual attributes, wherein setting the current value of the stored interestedness threshold comprises increasing the stored interestedness threshold based at least in part on a determination that the user has previously canceled a number of system-initiated video recordings; obtain one or more current physiological measurements of the user; derive an interestedness score based at least in part on the one or more obtained current physiological measurements; compare the derived interestedness score to the current value of the stored interestedness threshold; and initiate video recording of a scene by a wearable computing device when the derived interestedness score exceeds the current value of the stored interestedness threshold.

20. A method, performed by a wearable computing device, comprising: identifying one or more current contextual attributes of a current context of a user; setting a current value of a stored interestedness threshold based at least in part on the one or more identified current contextual attributes, wherein setting the current value of the stored interestedness threshold comprises decreasing the stored interestedness threshold based at least in part on a determination that the user has previously initiated a number of video recordings; obtaining one or more current physiological measurements of the user; deriving an interestedness score based at least in part on the one or more obtained current physiological measurements; comparing the derived interestedness score to the current value of the stored interestedness threshold; and initiating video recording of a scene by the wearable computing device when the derived interestedness score exceeds the current value of the stored interestedness threshold.

21. The method of claim 20, wherein decreasing the stored interestedness threshold based at least in part on a determination that the user has previously initiated a number of video recordings comprises: decreasing the stored interestedness threshold based at least in part on the determination that the user has previously initiated a number of video recordings in one or more contextual situations that include detection of attributes associated with one or more distinct people.

22. A system comprising:
one or more processors; and
one or more non-transitory computer-readable media storing instructions that are executable by the one or more processors to:
identify one or more current contextual attributes of a current context of a user;
set a current value of a stored interestedness threshold based at least in part on the one or more identified current contextual attributes, wherein setting the current value of the stored interestedness threshold comprises decreasing the stored interestedness threshold based at least in part on a determination that the user has previously initiated a number of video recordings;
obtain one or more current physiological measurements of the user;
derive an interestedness score based at least in part on the one or more obtained current physiological measurements;
compare the derived interestedness score to the current value of the stored interestedness threshold; and
initiate video recording of a scene by a wearable computing device when the derived interestedness score exceeds the current value of the stored interestedness threshold.

23. The system of claim 22, wherein decreasing the stored interestedness threshold based at least in part on a determination that the user has previously initiated a number of video recordings comprises:
decreasing the stored interestedness threshold based at least in part on the determination that the user has previously initiated a number of video recordings in one or more contextual situations that include detection of attributes associated with one or more distinct people.

\* \* \* \* \*